United States Patent
Shirasaki

[19]

[11] Patent Number: 5,930,045
[45] Date of Patent: *Jul. 27, 1999

[54] OPTICAL APPARATUS WHICH USES A VIRTUALLY IMAGED PHASED ARRAY TO PRODUCE CHROMATIC DISPERSION

[75] Inventor: Masataka Shirasaki, Kawasaki, Japan

[73] Assignee: Fujitsu, Ltd., Kawasaki, Japan

[ * ] Notice: This patent is subject to a terminal disclaimer.

[21] Appl. No.: 08/796,842

[22] Filed: Feb. 7, 1997

Related U.S. Application Data

[63] Continuation-in-part of application No. 08/685,362, Jul. 24, 1996.

[30] Foreign Application Priority Data

Jul. 26, 1995 [JP] Japan .................................. 7-190535

[51] Int. Cl.⁶ .............................. G02B 27/00; G02B 5/04
[52] U.S. Cl. ......................... 359/577; 359/615; 359/839; 359/857
[58] Field of Search ................................. 385/15, 27, 39; 359/577, 615, 839, 856, 857, 578, 579, 114, 127, 153, 161, 618, 629, 634, 636, 637, 639; 356/346, 352; 372/25

[56] References Cited

U.S. PATENT DOCUMENTS

| | | | |
|---|---|---|---|
| 3,832,030 | 8/1974 | Gloge ........................................ | 385/33 |
| 4,655,547 | 4/1987 | Heritage et al. ....................... | 359/563 |
| 4,820,019 | 4/1989 | Yoshida et al. ......................... | 359/578 |
| 5,071,225 | 12/1991 | Inoue ..................................... | 359/589 |
| 5,119,454 | 6/1992 | McMahon ................................ | 385/49 |
| 5,166,818 | 11/1992 | Chase et al. ............................. | 359/615 |
| 5,309,456 | 5/1994 | Horton .................................... | 372/25 |
| 5,715,095 | 2/1998 | Hiratsuka et al. ...................... | 359/634 |
| 5,786,915 | 7/1998 | Scobey .................................... | 359/127 |

FOREIGN PATENT DOCUMENTS 0026669  5/1930  Australia ................................ 359/578

OTHER PUBLICATIONS

M. Shirasaki, Large Angular–Dispersion By Virtually–Imaged Phased–Array (VIPA) and Its Application to Wavelength Demultiplexing, MOC '95, Hiroshima, Oct. 1995.
M. Shirasaki, Large Angular Dispersion by a Virtually–Imaged Phased Array and its Application to a Wavelength Demultimplexer, Optics Letters, vol. 21, No. 5, Mar. 1996.
M. Shirasaki, Temperature Independent Interferometer For WDM Filters, Paper WeD.1.6 ECOC '96 (European Conference on Optical Communication), Sep. 18, 1996.
M. Shirasaki, Filtering Characteristics of Virtually–Imaged Phased Array, Presented at IPR (Integrated Photonics Research) Topical Meeting Paper IMC3, Apr. 29, 1996, Boston, MA.

*Primary Examiner*—Thong Nguyen
*Assistant Examiner*—John Juba, Jr.
*Attorney, Agent, or Firm*—Staas & Halsey

[57] ABSTRACT

An apparatus which adds "opposite dispersion" to light, to compensate for chromatic dispersion of the light caused by travelling through an optical fiber. The apparatus includes a virtually imaged phased array (VIPA), and a light returning device. The light returning device is typically a mirror. The VIPA provides angular dispersion to the light, and the light returning device returns the light back to the VIPA to undergo multiple reflection inside the VIPA.

66 Claims, 15 Drawing Sheets

OPTICAL APPARATUS WHICH USES A VIRTUALLY IMAGED PHASED ARRAY TO PRODUCE CHROMATIC DISPERSION

CROSS-REFERENCE TO RELATED APPLICATIONS

This application is a continuation-in-part (CIP) of U.S. application Ser. No. 08/685,362, filed Jul. 24, 1996, and which is incorporated herein by reference.

This application claims priority to Japanese patent application number 07-190535, filed Jul. 26, 1995, in Japan, and which is incorporated herein by reference.

BACKGROUND OF THE INVENTION

1. Field of the Invention

The present invention relates to an apparatus producing chromatic dispersion, and which can be used to compensate for chromatic dispersion accumulated in an optical fiber transmission line. More specifically, the present invention relates to an apparatus which uses a virtually imaged phased array to produce chromatic dispersion.

2. Description of the Related Art

FIG. 1(A) is a diagram illustrating a conventional fiber optic communication system, for transmitting information via light. Referring now to FIG. 1(A), a transmitter 30 transmits pulses 32 through an optical fiber 34 to a receiver 36. Unfortunately, chromatic dispersion, also referred to as "wavelength dispersion", of optical fiber 34 degrades the signal quality of the system.

More specifically, as a result of chromatic dispersion, the propagating speed of a signal in an optical fiber depends on the wavelength of the signal. For example, when a pulse with a longer wavelength (for example, a pulse with wavelengths representing a "red" color pulse) travels faster than a pulse with a shorter wavelength (for example, a pulse with wavelengths representing a "blue" color pulse), the dispersion is typically referred to as "normal" dispersion. By contrast, when a pulse with a shorter wavelength (such as a blue color pulse) is faster than a pulse with a longer wavelength (such as a red color pulse), the dispersion is typically referred to as "anomalous" dispersion.

Therefore, if pulse 32 consists of red and blue color pulses when emitted from transmitter 30, pulse 32 will be split as it travels through optical fiber 34 so that a separate red color pulse 38 and a blue color pulse 40 are received by receiver 36 at different times. FIG. 1(A) illustrates a case of "normal" dispersion, where a red color pulse travels faster than a blue color pulse.

As another example of pulse transmission, FIG. 1(B) is a diagram illustrating a pulse 42 having wavelength components continuously from blue to red, and transmitted by transmitter 30. FIG. 1(C) is a diagram illustrating pulse 42 when arrived at receiver 36. Since the red component and the blue component travel at different speeds, pulse 42 is broadened in optical fiber 34 and, as illustrated by FIG. 1(C), is distorted by chromatic dispersion. Such chromatic dispersion is very common in fiber optic communication systems, since all pulses include a finite range of wavelengths.

Therefore, for a fiber optic communication system to provide a high transmission capacity, the fiber optic communication system must compensate for chromatic dispersion.

FIG. 2 is a diagram illustrating a fiber optic communication system having an opposite dispersion component to compensate for chromatic dispersion. Referring now to FIG. 2, generally, an opposite dispersion component 44 adds an "opposite" dispersion to a pulse to cancel dispersion caused by travelling through optical fiber 34.

There are conventional devices which can be used as opposite dispersion component 44. For example, FIG. 3 is a diagram illustrating a fiber optic communication system having a dispersion compensation fiber which has a special cross-section index profile and thereby acts as an opposite dispersion component, to compensate for chromatic dispersion. Referring now to FIG. 3, a dispersion compensation fiber 46 provides an opposite dispersion to cancel dispersion caused by optical fiber 34. However, a dispersion compensation fiber is expensive to manufacture, and must be relatively long to sufficiently compensate for chromatic dispersion. For example, if optical fiber 34 is 100 km in length, then dispersion compensation fiber 46 should be approximately 20 to 30 km in length.

FIG. 4 is a diagram illustrating a chirped grating for use as an opposite dispersion component, to compensate for chromatic dispersion. Referring now to FIG. 4, light travelling through an optical fiber and experiencing chromatic dispersion is provided to an input port 48 of an optical circulator 50. Circulator 50 provides the light to chirped grating 52. Chirped grating 52 reflects the light back towards circulator 50, with different wavelength components reflected at different distances along chirped grating 52 so that different wavelength components travel different distances to thereby compensate for chromatic dispersion. For example, chirped grating 52 can be designed so that longer wavelength components are reflected at a farther distance along chirped grating 52, and thereby travel a farther distance than shorter wavelength components. Circulator 50 then provides the light reflected from chirped grating 52 to an output port 54. Therefore, chirped grating 52 can add opposite dispersion to a pulse.

Unfortunately, a chirped grating has a very narrow bandwidth for reflecting pulses, and therefore cannot provide a wavelength band sufficient to compensate for light including many wavelengths, such as a wavelength division multiplexed light. A number of chirped gratings may be cascaded for wavelength multiplexed signals, but this results in an expensive system. Instead, a chirped grating with a circulator, as in FIG. 4, is more suitable for use when a single channel is transmitted through a fiber optic communication system.

FIG. 5 is a diagram illustrating a conventional diffraction grating, which can be used in producing chromatic dispersion. Referring now to FIG. 5, a diffraction grating 56 has a grating surface 58. Parallel lights 60 having different wavelengths are incident on grating surface 58. Lights are reflected at each step of grating surface 58 and interfere with each other. As a result, lights 62, 64 and 66 having different wavelengths are output from diffraction grating 56 at different angles. A diffraction grating can be used in a spatial grating pair arrangement, as discussed in more detail below, to compensate for chromatic dispersion.

More specifically, FIG. 6(A) is a diagram illustrating a spatial grating pair arrangement for use as an opposite dispersion component, to compensate for chromatic dispersion. Referring now to FIG. 6(A), light 67 is diffracted from a first diffraction grating 68 into a light 69 for shorter wavelength and a light 70 for longer wavelength. These lights 69 and 70 are then diffracted by a second diffraction grating 71 into lights propagating in the same direction. As can be seen from FIG. 6(A), wavelength components having different wavelengths travel different distances, to add opposite dispersion and thereby compensate for chromatic dispersion. Since longer wavelengths (such as lights 70) travel longer distance than shorter wavelengths (such as lights 69), a spatial grating pair arrangement as illustrated in FIG. 6(A) has anomalous dispersion.

FIG. 6(B) is a diagram illustrating an additional spatial grating pair arrangement for use as an opposite dispersion component, to compensate for chromatic dispersion. As illustrated in FIG. 6(B), lenses 72 and 74 are positioned between first and second diffraction gratings 68 and 71 so that they share one of the focal points. Since longer wavelengths (such as lights 70) travel shorter distance than shorter wavelengths (such as lights 69), a spatial grating pair arrangement as illustrated in FIG. 6(B) has normal dispersion.

A spatial grating pair arrangement as illustrated in FIGS. 6(A) and 6(B) is typically used to control dispersion in a laser resonator. However, a practical spatial grating pair arrangement cannot provide a large enough dispersion to compensate for the relatively large amount of chromatic dispersion occurring in a fiber optic communication system. More specifically, the angular dispersion produced by a diffraction grating is usually extremely small, and is typically approximately 0.05 degrees/nm. Therefore, to compensate for chromatic dispersion occurring in a fiber optic communication system, first and second gratings 68 and 71 would have to be separated by very large distances, thereby making such a spatial grating pair arrangement impractical.

SUMMARY OF THE INVENTION

Therefore, it is an object of the present invention to provide an apparatus which produces chromatic dispersion, and which is practical for compensating for chromatic dispersion accumulated in an optical fiber.

Objects of the present invention are achieved by providing an apparatus which includes a device herein referred to as a "virtually imaged phased array", or "VIPA". The VIPA produces a light propagating away from the VIPA. The apparatus also includes a light returning device which returns the light back to the VIPA to undergo multiple reflection inside the VIPA. The light returning device can be arranged to return light back to the VIPA having a respective interference order, without returning light back to the VIPA having any other interference order.

Objects of the present invention are also achieved by providing an apparatus which includes a VIPA that receives an input light having a wavelength within a continuous range of wavelengths and produces a continuously corresponding output light. The output light is spatially distinguishable (for example, it travels in a different direction) from an output light formed for an input light having any other wavelength within the continuous range of wavelengths. If the output light is distinguishable by its travelling angle, the apparatus has an angular dispersion.

Further, objects of the present invention are achieved by providing a VIPA and a light returning device, wherein the VIPA includes a passage area and a transparent material. The passage area allows light to be received into, and be output from, the VIPA. The transparent material has first and second surfaces thereon, the second surface having a reflectivity which allows a portion of light incident thereon to be transmitted therethrough. An input light is received in the VIPA through the passage area and is reflected a plurality of times in the transparent material between the first and second surfaces to cause a plurality of lights to be transmitted through the second surface. The plurality of transmitted lights interfere with each other to produce an output light. The input light is at a wavelength within a continuous range of wavelengths and the output light is spatially distinguishable from an output light formed for an input light having any other wavelength within the continuous range of wavelengths. The light returning device causes the output light to be returned in the exactly opposite direction back to the second surface and pass therethrough into the VIPA so that the output light undergoes multiple reflection in the VIPA and is then output from the passage area of the VIPA to the input path.

In addition, object of the present invention are achieved by providing an apparatus which includes a VIPA that produces a plurality of output lights at the same wavelength of the input light and having different interference orders. The apparatus also includes a light returning device which returns the output light in one of the interference orders to the VIPA, and does not return the other output lights. In this manner, only light corresponding to a single interference order is returned back to the VIPA.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1A:
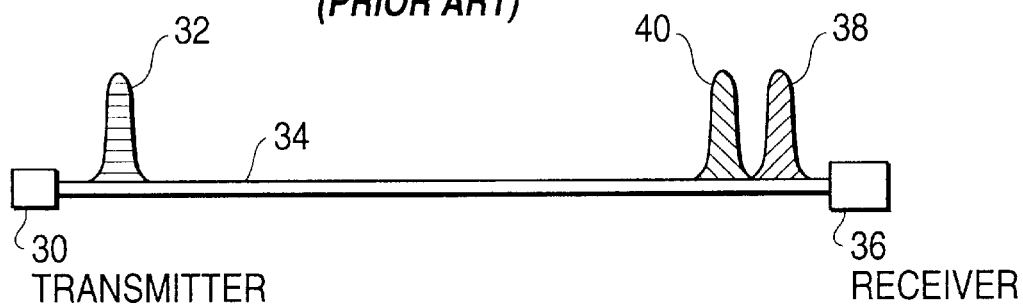
FIG. 1(A) (prior art) is a diagram illustrating a conventional fiber optic communication system.
Figure 1B:
FIG. 1(B) is a diagram illustrating a pulse before transmission through a fiber in a conventional fiber optic communication system.
Figure 1C:
FIG. 1(C) is a diagram illustrating a pulse after being transmitted through a fiber in a conventional fiber optic communication system.
Figure 2:
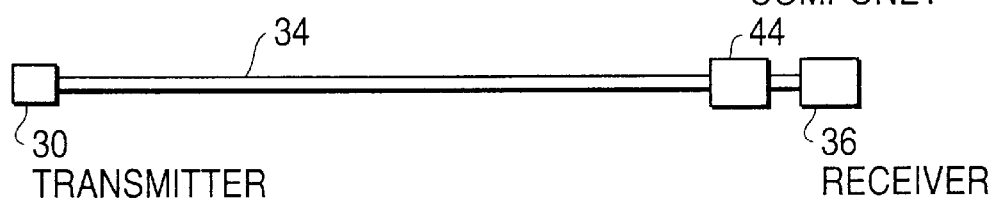
FIG. 2 (prior art) is a diagram illustrating a fiber optic communication system having an opposite dispersion component to compensate for chromatic dispersion.
Figure 3:
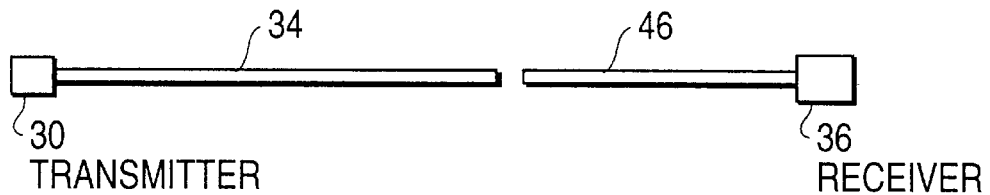
FIG. 3 (prior art) is a diagram illustrating a fiber optic communication system having a dispersion compensation fiber as an opposite dispersion component.
Figure 4:
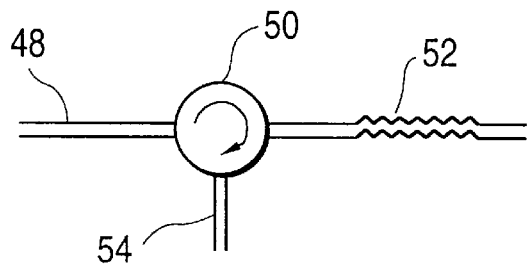
FIG. 4 (prior art) is a diagram illustrating a chirped grating for use as an opposite dispersion component, to compensate for chromatic dispersion.
Figure 5:
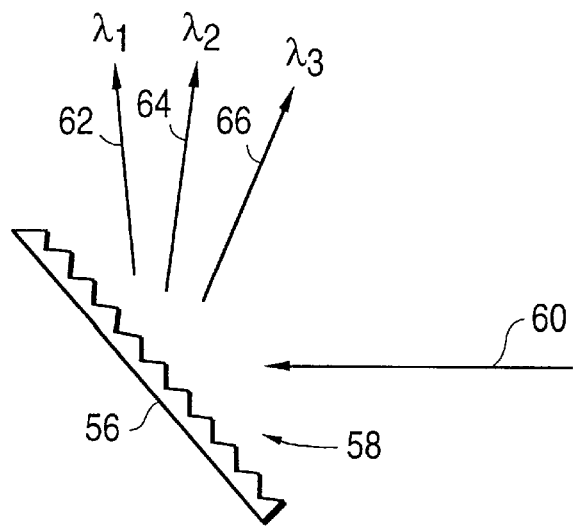
FIG. 5 (prior art) is a diagram illustrating a conventional diffraction grating.

Reference will now be made in detail to the present preferred embodiments of the present invention, examples of which are illustrated in the accompanying drawings, wherein like reference numerals refer to like elements throughout.

Figure 7:
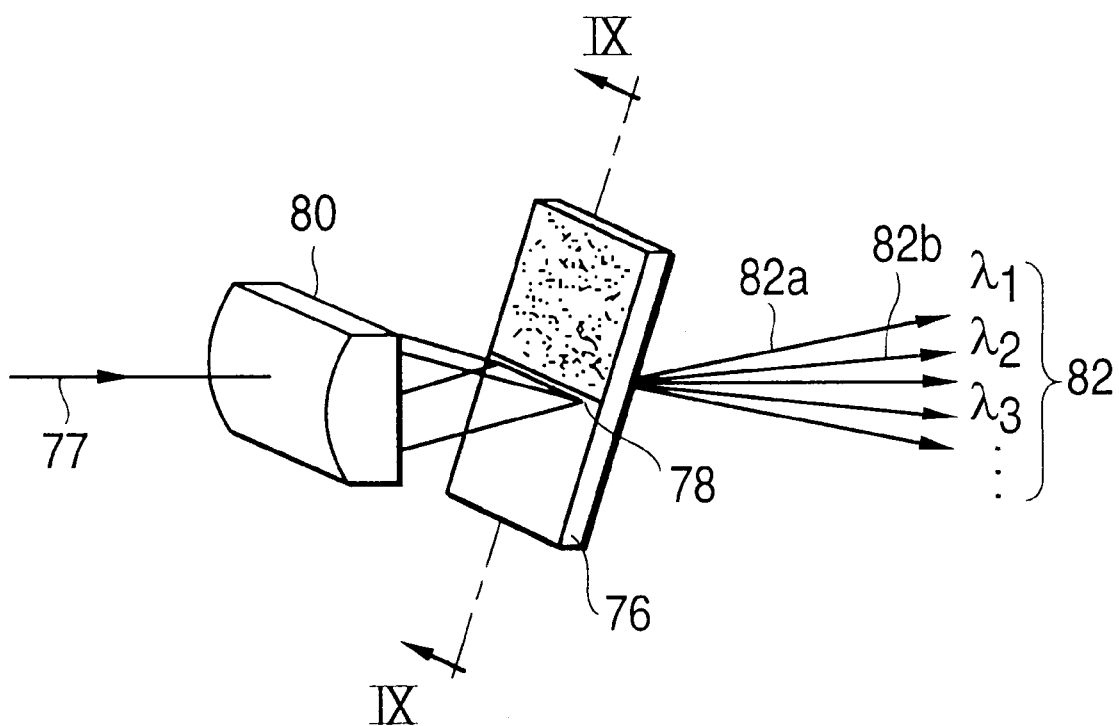
FIG. 7 is a diagram illustrating a VIPA, according to an embodiment of the present invention.

FIG. 7 is a diagram illustrating a virtually imaged phased array (VIPA), according to an embodiment of the present invention. Moreover, hereinafter, the terms "virtually imaged phased array" and "VIPA" may be used interchangeably.

Referring now to FIG. 7, a VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 to be received inside VIPA 76. VIPA 78 then outputs a luminous flux 82 of collimated light, where the output angle of luminous flux 82 varies as the wavelength of input light 77 changes. For example, when input light 77 is at a wavelength $\lambda 1$, VIPA 76 outputs a luminous flux 82a at wavelength $\lambda 1$ in a specific direction. When input light 77 is at a wavelength $\lambda 2$, VIPA 76 outputs a luminous flux 82b at wavelength $\lambda 2$ in a different direction. Therefore, VIPA 76 produces luminous fluxes 82a and 82b which are spatially distinguishable from each other.

Figure 8:
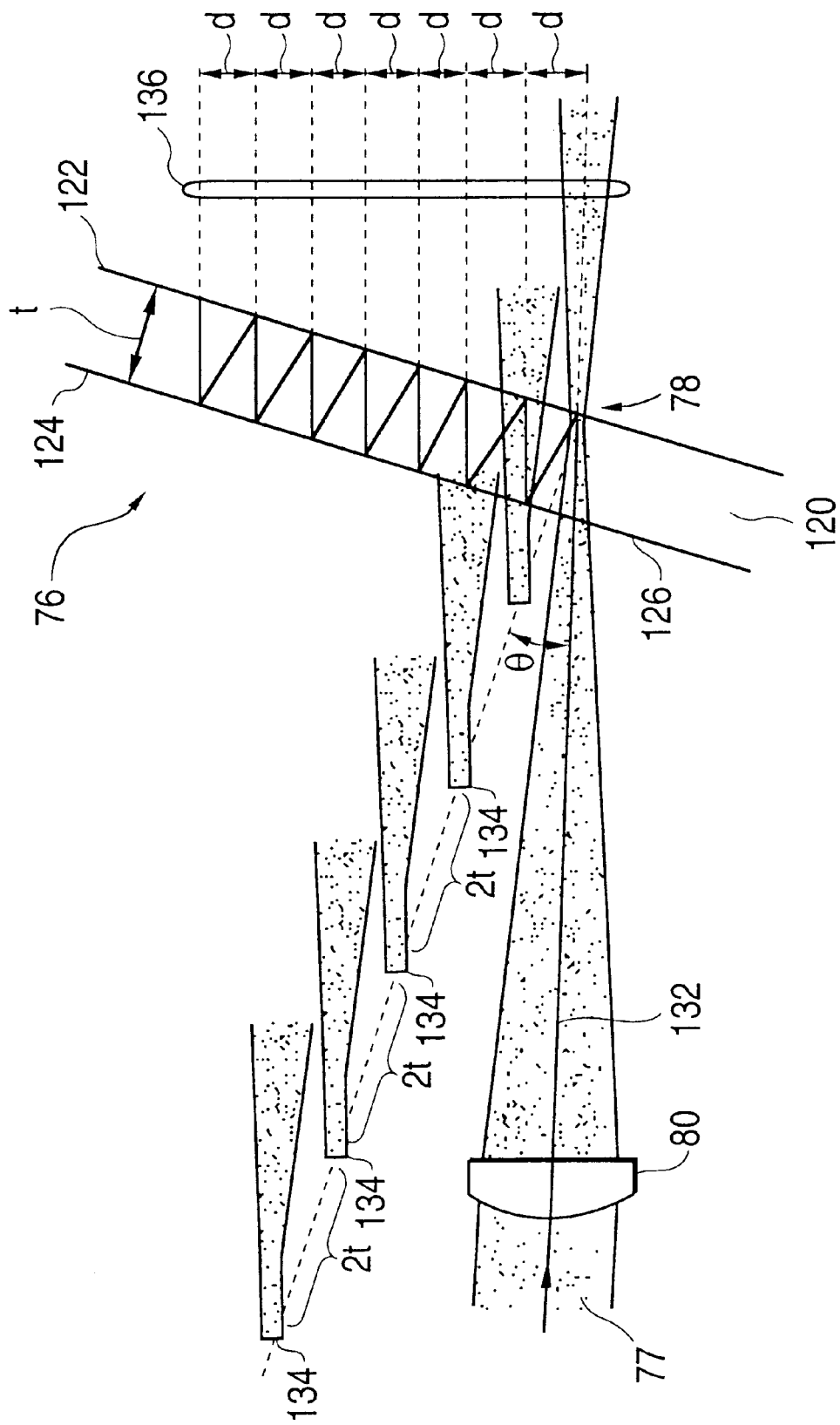
FIG. 8 is a detailed diagram illustrating the VIPA of FIG. 7, according to an embodiment of the present invention.

FIG. 8 is a detailed diagram illustrating VIPA 76, according to an embodiment of the present invention. Referring now to FIG. 8, VIPA 76 includes a plate 120 made of, for example, glass, and having reflecting films 122 and 124 thereon. Reflecting film 122 preferably has a reflectance of approximately 95% or higher, but less than 100%. Reflecting film 124 preferably has a reflectance of approximately 100%. A radiation window 126 is formed on plate 120 and preferably has a reflectance of approximately 0% reflectance.

Input light 77 is focused into focal line 78 by lens 80 through radiation window 126, to undergo multiple reflection between reflecting films 122 and 124. Focal line 78 is preferably on the surface of plate 120 to which reflecting film 122 is applied. Thus, focal line 78 is essentially line focused onto reflecting film 122 through radiation window 126. The width of focal line 78 can be referred to as the "beam waist" of input light 77 as focused by lens 80. Thus, the embodiment of the present invention as illustrated is FIG. 8 focuses the beam waist of input light 77 onto the far surface (that is, the surface having reflecting film 122 thereon) of plate 120. By focusing the beam waist on the far surface of plate 120, the present embodiment of the present invention reduces the possibility of overlap between (i) the area of radiation window 126 on the surface of plate 120 covered by input light 77 as it travels through radiation window 126 (for example, the area "a" illustrated in FIG. 11, discussed in more detail further below), and (ii) the area on reflecting film 124 covered by input light 77 when input light 77 is reflected for the first time by reflecting film 124 (for example, the area "b" illustrated in FIG. 11, discussed in more detail further below). It is desirable to reduce such overlap to ensure proper operation of the VIPA.

In FIG. 8, an optical axis 132 of input light 77 has a small tilt angle $\theta$. Upon the first reflection off of reflecting film 122, 5% of the light passes through reflecting film 122 and diverges after the beam waist, and 95% of the light is reflected towards reflecting film 124. After being reflecting by reflecting film 124 for the first time, the light again hits reflecting film 122 but is displaced by an amount d. Then, 5% of the light passes through reflecting film 122. In a similar manner, as illustrated in FIG. 8, the light is split into many paths with a constant separation d. The beam shape in each path forms so that the light diverges from virtual images 134 of the beam waist. Virtual images 134 are located with constant spacing 2 t along a line that is normal to plate 120, where t is the thickness of plate 120. The positions of the beam waists in virtual images 134 are self-aligned, and there is no need to adjust individual positions. The lights diverging from virtual images 134 interfere with each other and form collimated light 136 which propagates in a direction that changes in accordance with the wavelength of input light 77.

The spacing of light paths is $d = 2\ t\ \sin\theta$, and the difference in the path lengths between adjacent beams is $2\ t\ \cos\theta$. The angular dispersion is proportional to the ratio of these two numbers, which is $\cot\theta$. As a result, a VIPA produces a significantly large angular dispersion.

As easily seen from FIG. 8, the term "virtually imaged phased array" arises from the formation of an array of virtual images 134.

Figure 9:
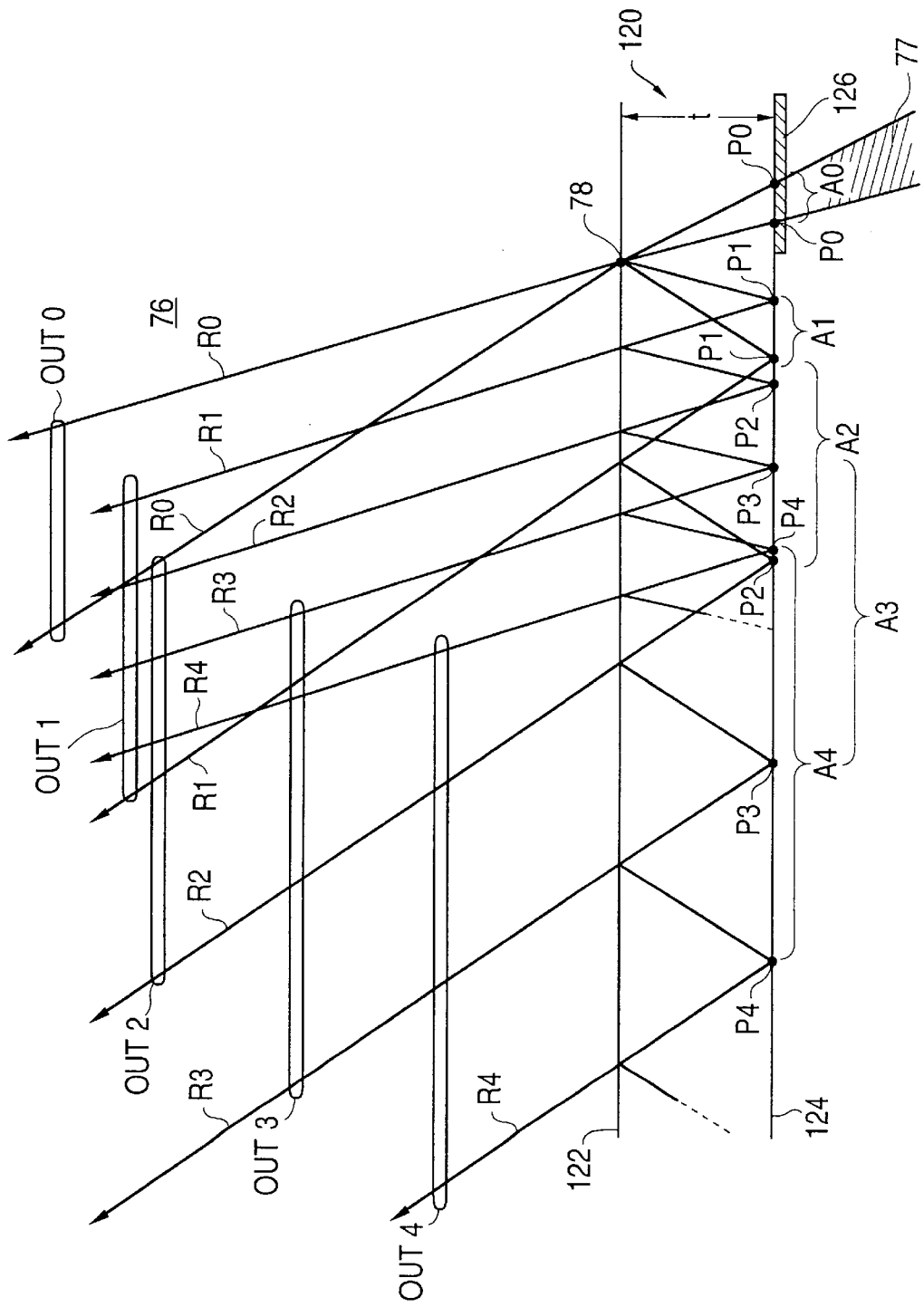
FIG. 9 is a diagram illustrating a cross-section along lines IX—IX of the VIPA illustrated in FIG. 7, according to embodiment of the present invention.

FIG. 9 is a diagram illustrating a cross-section along lines IX—IX of VIPA 76 illustrated in FIG. 7, according to embodiment of the present invention. Referring now to FIG. 9, plate 120 has reflecting surfaces 122 and 124 thereon. Reflecting surfaces 122 and 124 are in parallel with each other and spaced by the thickness t of plate 120. Reflecting surfaces 122 and 124 are typically reflecting films deposited on plate 120. As previously described, reflecting surface 124 has a reflectance of approximately 100%, except in radiation window 126, and reflecting surface 122 has a reflectance of approximately 95% or higher. Therefore, reflecting surface 122 has a transmittance of approximately 5% or less so that approximately 5% of less of light incident on reflecting surface 122 will be transmitted therethrough and approximately 95% or more of the light will be reflected. The reflectances of reflecting surfaces 122 and 124 can easily be changed in accordance with the specific VIPA application. However, generally, reflecting surface 122 should have a reflectance which is less than 100% so that a portion of incident light can be transmitted therethrough.

Reflecting surface 124 has radiation window 126 thereon. Radiation window 126 allows light to pass therethrough, and preferably has no reflectance, or a very low reflectance. Radiation window 126 receives input light 77 to allow input light 77 to be received between, and reflected between, reflecting surfaces 122 and 124.

Since FIG. 9 represents a cross-section along lines IX—IX in FIG. 7, focal line 78 in FIG. 7 appears as a "point" in FIG. 9. Input light 77 then propagates radially from focal line 78. Moreover, as illustrated in FIG. 9, focal line 78 is positioned on reflecting surface 122. Although it is not required for focal line 78 to be on reflecting surface 122, a shift in the positioning of focal line 78 may cause small changes in the characteristics of VIPA 76.

As illustrated in FIG. 9, input light 77 enters plate 120 through an area A0 in radiation window 126, where points P0 indicate peripheral points of area A0.

Due to the reflectivity of reflecting surface 122, approximately 95% or more of input light 77 is reflected by reflecting surface 122 and is incident on area A1 of reflecting surface 124. Points P1 indicate peripheral points of area A1. After reflecting off area A1 on reflecting surface 124, input light 77 travels to reflecting surface 122 and is partially transmitted through reflecting surface 122 as output light Out1 defined by rays R1. In this manner, as illustrated in FIG. 9, input light 77 experiences multiple reflections between reflecting surfaces 122 and 124, wherein each reflection off of reflecting surface 122 also results in a respective output light being transmitted therethrough. Therefore, for example, input light 77 reflects off of areas A2, A3 and A4 to produce output lights Out2, Out3 and Out4. Points P2 indicate peripheral points of area A2, points P3 indicate peripheral points of area A3, and points P4 indicate peripheral points of area A4. Output light Out2 is defined by rays R2, output light Out3 is defined by rays R3 and output light Out4 is defined by rays R4. Although FIG. 9 only illustrates output lights Out0, Out1, Out2, Out3 and Out4, there will actually be many more output lights, depending on the power on input light 77 and the reflectances of reflecting surfaces 122 and 124. As will be discussed in more detail further below, the output lights interfere with each other to produce a luminous flux having a direction which changes in accordance with the wavelength of input light 77.

Figure 10:
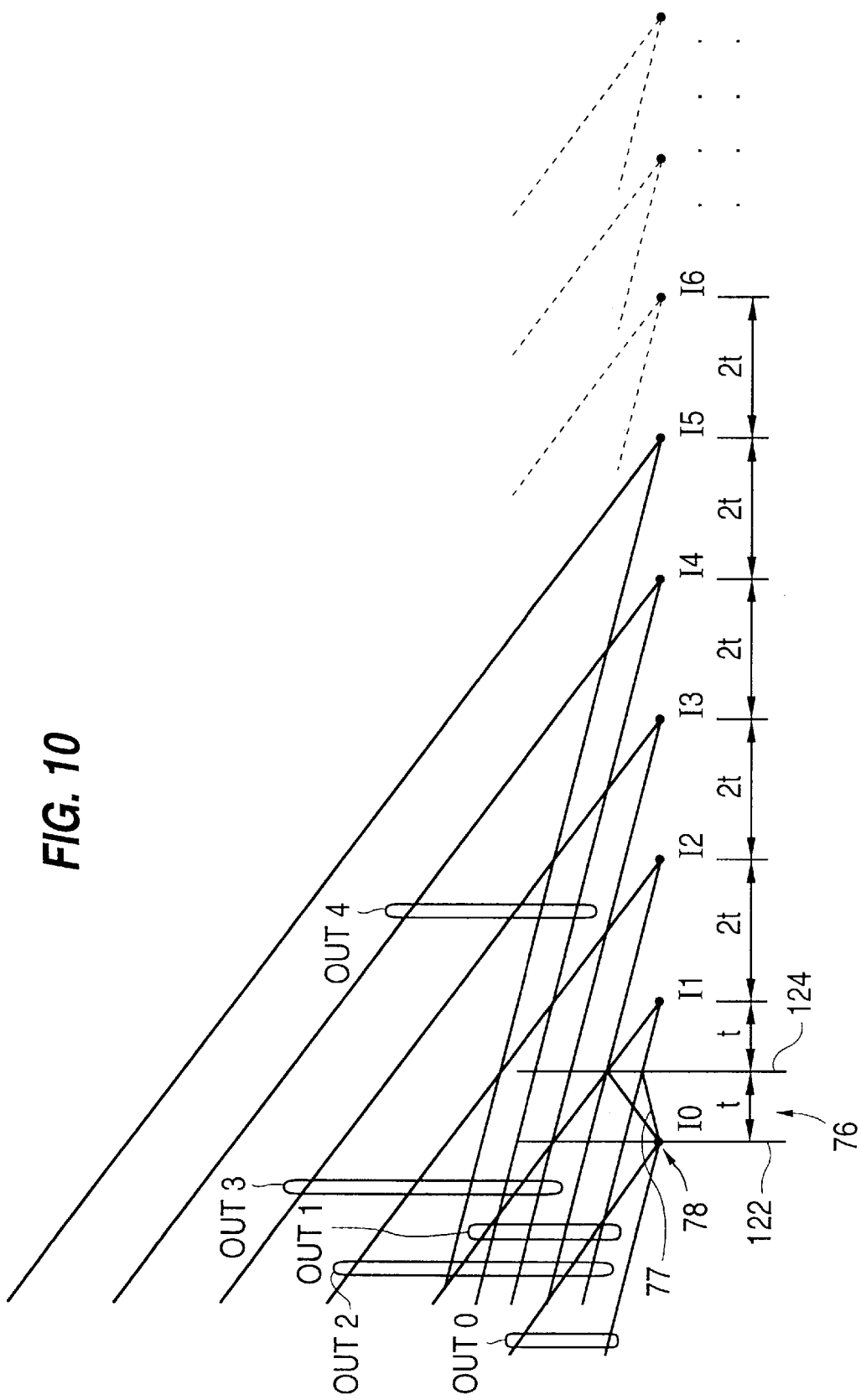
FIG. 10 is a diagram illustrating interference between reflections produced by a VIPA, according to an embodiment of the present invention.

FIG. 10 is a diagram illustrating interference between reflections produced by a VIPA, according to an embodiment of the present invention. Referring now to FIG. 10, light travelling from focal line 78 is reflected by reflecting surface 124. As previously described, reflecting surface 124 has a reflectance of approximately 100% and, therefore, functions essentially as a mirror. As a result, output light Out1 can be optically analyzed as if reflecting surfaces 122 and 124 did not exist and, instead, output light Out1 was emitted from a focal line $I_1$. Similarly, output lights Out2, Out3 and Out4 can be optically analyzed as if they were emitted from focal lines $I_1$, $I_2$, $I_3$ and $I_4$, respectively. The focal lines $I_2$, $I_3$ and $I_4$ are virtual images of a focal line $I_0$.

Therefore, as illustrated in FIG. 10, focal line $I_1$ is a distance 2 t from focal line $I_0$, where t equals the distance between reflecting surfaces 122 and 124. Similarly, each subsequent focal line is a distance 2 t from the immediately preceding focal line. Thus, focal line $I_2$ is a distance 2 t from focal line $I_1$. Moreover, each subsequent multiple reflection between reflecting surfaces 122 and 124 produces an output light which is weaker in intensity than the previous output light. Therefore, output light Out2 is weaker in intensity than output light Out1.

As illustrated in FIG. 10, output lights from the focal lines overlap and interfere with each other. This interference produces a luminous flux which travels in a specific direction depending on the wavelength of input light 77.

A VIPA according to the above embodiments of the present invention has strengthening conditions which are characteristics of the design of the VIPA. The strengthening conditions increase the interference of the output lights so that a luminous flux is formed. The strengthening conditions of the VIPA are represented by the following Equation (1):

$$2t\times\cos\theta = m\lambda$$

where θ indicates the propagation direction of the resulting luminous flux as measured from a line perpendicular to the surface of reflecting surfaces 122 and 124, λ indicates the wavelength of the input light, t indicates the distance between the reflecting surfaces 122 and 124, and m indicates an integer.

Therefore, if t is constant and m is assigned a specific value, then the propagation direction θ of the luminous flux formed for input light having wavelength λ can be determined.

More specifically, input light 77 is radially dispersed from focal line 78 through a specific angle. Therefore, input light having the same wavelength will be travelling in many different direction from focal line 78, to be reflected between reflecting surfaces 122 and 124. The strengthening conditions of the VIPA cause light travelling in a specific direction to be strengthened through interference of the output lights to form a luminous flux having a direction corresponding to the wavelength of the input light. Light travelling in different direction than the specific direction required by the strengthening condition will be weakened by the interference of the output lights.

Figure 11:
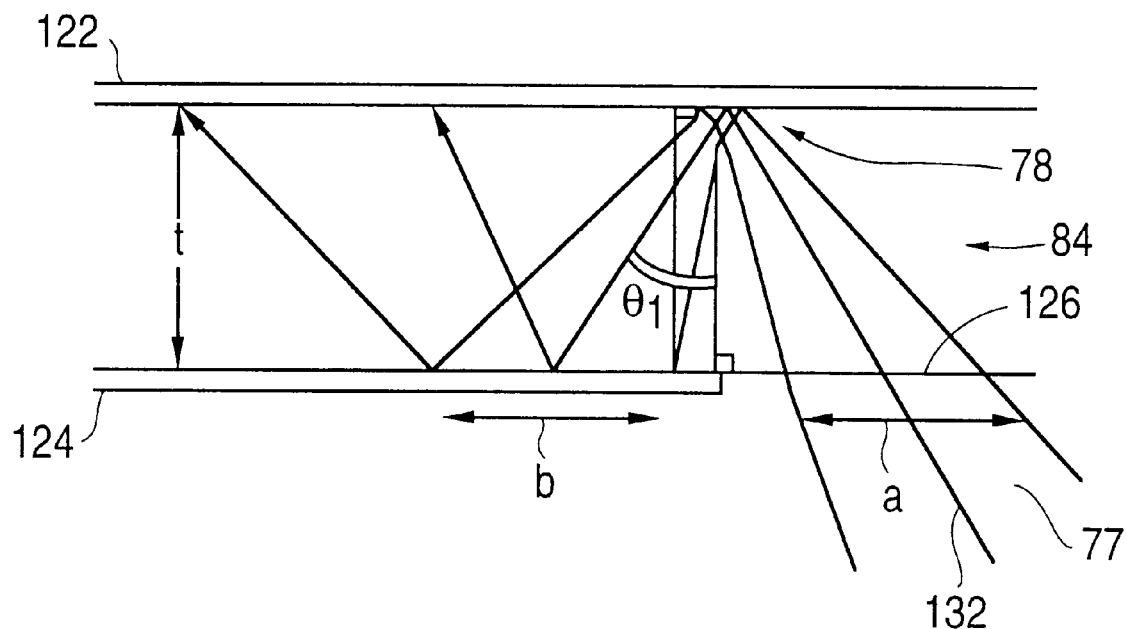
FIG. 11 is a diagram illustrating a cross-section along lines IX—IX of the VIPA illustrated in FIG. 7, for determining the tilt angle of input light, according to an embodiment of the present invention.

FIG. 11 is a diagram illustrating a cross-section along lines IX—IX of the VIPA illustrated in FIG. 7, showing characteristics of a VIPA for determining the angle of incidence, or tilt angle, of input light, according to an embodiment of the present invention.

Referring now to FIG. 11, input light 77 is collected by a cylindrical lens (not illustrated) and focused at focal line 78. As illustrated in FIG. 11, input light 77 covers an area having a width equal to "a" on radiation window 126. After input light 77 is reflected one time from reflecting surface 122, input light 77 is incident on reflecting surface 124 and covers an area having a width equal to "b" on reflecting surface 124. Moreover, as illustrated in FIG. 11, input light 77 travels along optical axis 132 which is at a tilt angle θ1 with respect to the normal to reflecting surface 122.

The tilt angle θ1 should be set to prevent input light 77 from travelling out of radiation window 126 after being reflected the first time by reflecting surface 122. In other words, the tilt angle θ1 should be set so that input light 77 remains "trapped" between reflecting surfaces 122 and 124 and does not escape through radiation window 126. Therefore, to prevent input light 77 from travelling out of radiation window 126, the tilt angle θ1 should be set in accordance with the following Equation (2):

tilt of optical axis θ1 ≧ (a+b)/4t

Therefore, as illustrated by FIGS. 7–11, embodiments of the present invention include a VIPA which receives an input light having a respective wavelength within a continuous range of wavelengths. The VIPA causes multiple reflection of the input light to produce self-interference and thereby form an output light. The output light is spatially distinguishable from an output light formed for an input light having any other wavelength within the continuous range of wavelengths. For example, FIG. 9 illustrates an input light 77 which experiences multiple reflection between reflecting surfaces 122 and 124. This multiple reflection produces a plurality of output lights Out0, Out1, Out2, Out3 and Out 4 which interfere with each other to produce a spatially distinguishable luminous flux for each wavelength of input light 77.

"Self-interference" is a term indicating that interference occurs between a plurality of lights or beams which all originate from the same source. Therefore, the interference of output lights Out0, Out1, Out2, Out3 and Out4 is referred to as self-interference of input light 77, since output lights Out0, Out1, Out2, Out3 and Out4 all originate from the same source (that is, input light 77).

According to the above embodiments of the present invention, an input light can be at any wavelength within a continuous range of wavelengths. Thus, the input light is not limited to being a wavelength which is a value chosen from a range of discrete values.

In addition, according to the above embodiments of the present invention, the output light produced for an input light at a specific wavelength within a continuous range of wavelengths is spatially distinguishable from an output light which would have been produced if the input light was at a different wavelength within the continuous range of wavelengths. Therefore, as illustrated, for example, in FIG. 7, the travelling direction (that is, a "spatial characteristic") of the luminous flux 82 is different when input light 77 is at different wavelengths within a continuous range of wavelengths.

FIGS. 12 (A), 12 (B), 12(C) and 12(D) are diagram illustrating a method for producing a VIPA, according to an embodiment of the present invention.

Referring now to FIG. 12 (A), a parallel plate 164 is preferably made of glass and exhibits excellent parallelism. Reflecting films 166 and 168 are formed on both sides of the parallel plate 164 by vacuum deposition, ion spattering or other such methods. One of reflecting films 166 and 168 has a reflectance of nearly 100%, and the other reflecting film has a reflectance of lower than 100%, and preferably higher than 80%.

Figure 12A:
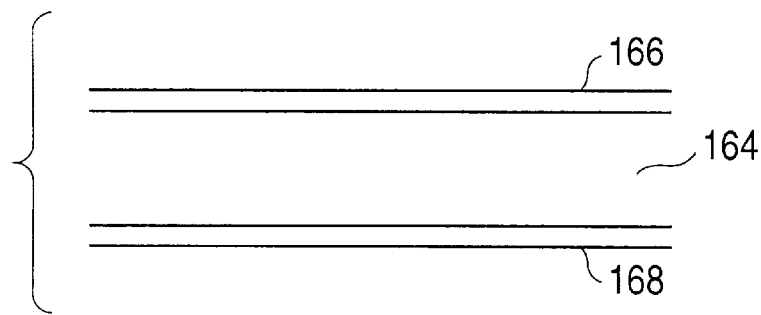
FIGS. 12(A), 12(B), 12(C) and 12(D) are diagrams illustrating a method for producing a VIPA, according to an embodiment of the present invention.
Figure 12B:
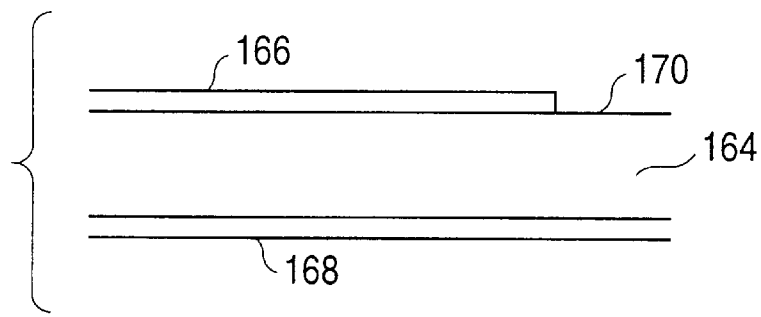
Figure 12C:
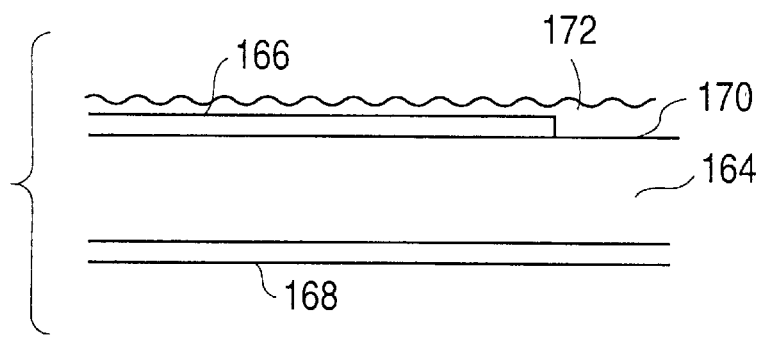
Figure 12D:
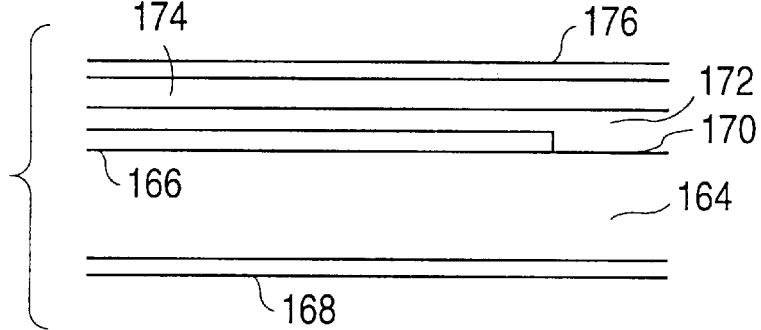

Referring now to FIG. 12(B), one of reflecting films 166 and 168 is partially shaved off to form a radiation window 170. In FIG. 12(B), reflecting film 166 is shown as being shaved off so that radiation window 170 can be formed on the same surface of parallel plate 164 as reflecting film 166. However, instead, reflecting film 168 can be partially shaved off so that a radiation window is formed on the same surface of parallel plate 164 as reflecting film 168. As illustrated by the various embodiment of the present invention, a radiation window can be on either side of parallel plate 164.

Shaving off a reflecting film can be performed by an etching process, but a mechanical shaving process can also be used and is less expensive. However, if a reflecting film is mechanically shaved, parallel plate 164 should be carefully processed to minimize damage to parallel plate 164. For example, if the portion of parallel plate 164 forming the radiation window is severely damaged, parallel plate 164 will generate excess loss caused by scattering of received input light.

Instead of first forming a reflecting film and then shaving it off, a radiation window can be produced by preliminarily masking a portion of parallel plate 164 corresponding to a radiation window, and then protecting this portion from being covered with reflecting film.

Referring now to FIG. 12 (C), a transparent adhesive 172 is applied onto reflecting film 166 and the portion of parallel plate 164 from which reflecting film 166 has been removed. Transparent adhesive 172 should generate the smallest possible optical loss since it is also applied to the portion of parallel plate 164 forming a radiation window.

Referring now to FIG. 12 (D), a transparent protector plate 174 is applied onto transparent adhesive 172 to protect reflecting film 166 and parallel plate 164. Since transparent adhesive 172 is applied to fill the concave portion generated by removing reflecting film 166, transparent protector plate 174 can be provided in parallel with the top surface of parallel plate 164.

Similarly, to protect reflecting film 168, an adhesive (not illustrated) can be applied to the top surface of reflecting film 168 and should be provided with a protector plate (not illustrated). If reflecting film 168 has a reflectance of about 100%, and there is no radiation window on the same surface of parallel plate 164, then an adhesive and protector plate do not necessarily have to be transparent.

Furthermore, an anti-reflection film 176 can be applied on transparent protector plate 174. For example, transparent protector plate 174 and radiation window 170 can be covered with anti-reflection film 176.

According to the above embodiments of the present invention, a focal line is described as being on the surface of a radiation window or on the opposite surface of a parallel plate from which input light enters. However, the focal line can be in the parallel plate, or before the radiation window.

According to the above embodiments of the present invention, two reflecting films reflect light therebetween, with the reflectance of one reflecting film being approximately 100%. However, a similar effect can be obtained with two reflecting films each having a reflectance of less than 100%. For example, both reflecting films can have a reflectance of 95%. In this case, each reflecting film has light travelling therethrough and causing interference. As a result, a luminous flux traveling in the direction depending on the wavelength is formed on both sides of the parallel plate on which the reflecting films are formed. Thus, the various reflectances of the various embodiments of the present invention can easily be changed in accordance with required characteristics of a VIPA.

According to the above embodiments of the present invention, a waveguide device is described as being formed by a parallel plate, or by two reflecting surfaces in parallel with each other. However, the plate or reflecting surfaces do not necessarily have to be parallel.

According to the above embodiments of the present invention, a VIPA uses multiple-reflection and maintains a constant phase difference between interfering lights. As a result, the characteristics of the VIPA are stable, thereby reducing optical characteristic changes causes by polarization. By contrast, the optical characteristics of a conventional diffraction grating experience undesirable changes in dependance on the polarization of the input light.

The above embodiments of the present invention are described as providing luminous fluxes which are "spatially distinguishable" from each other. "Spatially distinguishable" refers to the luminous fluxes being distinguishable in space. For example, various luminous fluxes are spatially distinguishable if they are collimated and travel in different directions, or are focused in different locations. However, the present invention is not intended to be limited to these precise examples, and there are many other ways in which luminous fluxes can be spatially distinguished from each other.

Figure 13:
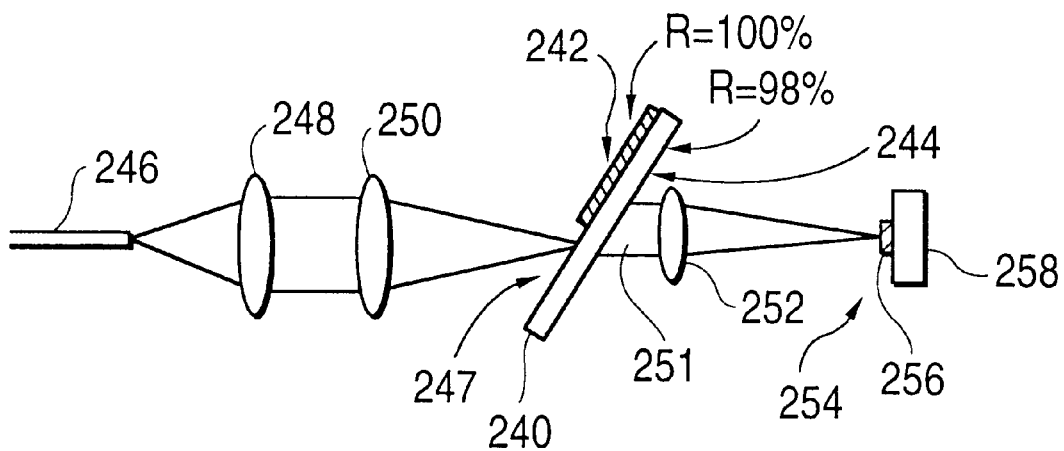
FIG. 13 is a diagram illustrating an apparatus which uses a VIPA as an angular dispersion component to produce chromatic dispersion, according to an embodiment of the present invention.

FIG. 13 is a diagram illustrating an apparatus which uses a VIPA as an angular dispersive component, instead of using diffraction gratings, to produce chromatic dispersion, according to an embodiment of the present invention. Referring now to FIG. 13, a VIPA 240 has a first surface 242 with a reflectivity of, for example, approximately 100%, and a second surface 244 with a reflectivity of, for example, approximately 98%. VIPA 240 also includes a radiation window 247. However, VIPA 240 is not intended to be limited to this specific configuration. Instead, VIPA 240 can have many different configurations as described herein.

As illustrated in FIG. 13, a light is output from a fiber 246, collimated by a collimating lens 248 and line-focused into VIPA 240 through radiation window 247 by a cylindrical lens 250. VIPA 240 then produces a collimated light 251 which is focused by a focusing lens 252 onto a mirror 254. Mirror 254 can be a mirror portion 256 formed on a substrate 258.

Mirror 254 reflects the light back through focusing lens 252 into VIPA 240. The light then undergoes multiple reflections in VIPA 240 and is output from radiation window 247. The light output from radiation window 247 travels through cylindrical lens 250 and collimating lens 248 and is received by fiber 246.

Therefore, light is output from VIPA 240 and reflected by mirror 254 back into VIPA 240. The light reflected by mirror 254 travels through the path which is exactly opposite in direction to the path through which it originally travelled. As will be seen in more detail below, different wavelength components in the light are focused onto different positions on mirror 254, and are reflected back to VIPA 240. As a result, different wavelength components travel different distances, to thereby produce chromatic dispersion.

Figure 14:
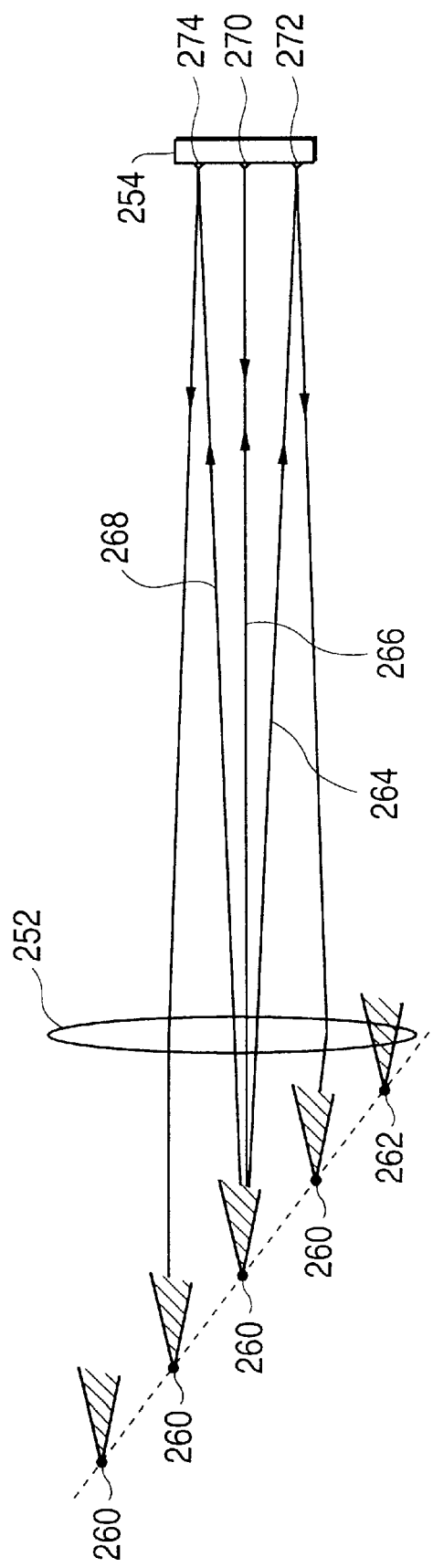
FIG. 14 is a more detailed diagram illustrating the operation of the apparatus in FIG. 13, according to an embodiment of the present invention.

FIG. 14 is a more detailed diagram illustrating the operation of the VIPA in FIG. 13, according to an embodiment of the present invention. Assume a light having various wavelength components is received by VIPA 240. As illustrated in FIG. 14, VIPA 240 will cause the formation of virtual images 260 of beam waist 262, where each virtual image 260 emits light.

As illustrated in FIG. 14, focusing lens 252 focuses the different wavelength components in a collimated light from VIPA 240 at different points on mirror 254. More specifically, a longer wavelength 264 focuses at point 272, a center wavelength 266 focuses at point 270, and a shorter wavelength 268 focuses at point 274. Then, longer wavelength 264 returns to a virtual image 260 which is closer to beam waist 262, as compared to center wavelength 266. Shorter wavelength 268 returns to a virtual image 260 which is farther from beam waist 262, as compared to center wavelength 266. Thus, the arrangement provides for normal dispersion.

Mirror 254 is designed to reflect only light in a specific interference order, and light in any other interference order should be focused out of mirror 254. More specifically, as previously described, a VIPA will output a collimated light. This collimated light will travel in a direction in which the path from each virtual image has a difference of $m\lambda$, where m is an integer. The mth order of interference is defined as an output light corresponding to m.

Figure 15:
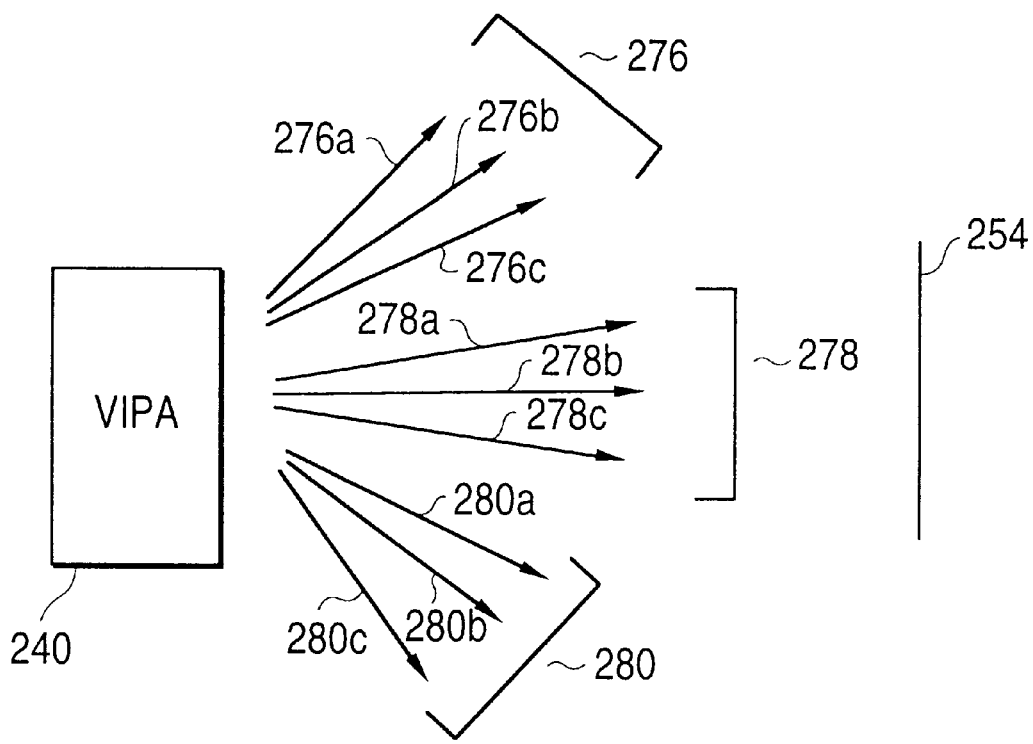
FIG. 15 is a diagram illustrating various orders of interference of a VIPA, according to an embodiment of the present invention.

For example, FIG. 15 is a diagram illustrating various orders of interference of a VIPA. Referring now to FIG. 15, a VIPA, such as VIPA 240, emits collimated lights 276, 278 and 280. Each collimated light 276, 278 and 280 corresponds to a different interference order. Therefore, for example, collimated light 276 is collimated light corresponding to an (n+2)th interference order, collimated light 278 is collimated light corresponding to an (n+1)th interference order, and collimated light 280 is collimated light corresponding to an nth interference order, wherein n is an integer. Collimated light 276 is illustrated as having several wavelength components 276a, 276b and 276c. Similarly, collimated light 278 is illustrated as having wavelength components 278a, 278b and 278c, and collimated light 280 is illustrated as having wavelength components 280a, 280b and 280c. Here, wavelength components 276a, 278a and 280a have the same wavelength. Wavelength components 276b, 278b and 280b have the same wavelength (but different from the wavelength of wavelength components 276a, 278a and 280a). Wavelength components 276c, 278c and 280c have the same wavelength (but different from the wavelength of wavelength components 276a, 278a and 280a, and the wavelength of wavelength components 276b, 278b and 280b). Although FIG. 15 only illustrates collimated light for three different interference orders, collimated lights will be emitted for many other interference orders.

Since collimated lights at the same wavelength for different interference orders travel in different directions and are therefore focused at different positions, mirror 254 can be made to reflect only light from a single interference order back into VIPA 240. For example, as illustrated in FIG. 15, the length of a reflecting portion of mirror 254 should be made relatively small, so that only light corresponding to a single interference order is reflected. More specifically, in FIG. 15, only collimated light 278 is reflected by mirror 254. In this manner, collimated lights 276 and 278 are focused out of mirror 254.

A wavelength division multiplexed light usually includes many channels. Referring again to FIG. 13, if the thickness t between first and second surfaces 242 and 244 of VIPA 240 is set at a specific value, the arrangement will be able to simultaneously compensate for dispersion in each channel.

More specifically, each channel has a center wavelength. These center wavelengths are usually spaced apart by a constant frequency spacing. The thickness t of VIPA 240 between first and second surfaces 242 and 244 should be set so that all of the wavelength components corresponding to the center wavelengths have the same output angle from VIPA 240 and thus the same focusing position on mirror 254. This is possible when the thickness t is set so that, for each channel, the round-trip optical length through VIPA 240 travelled by the wavelength component corresponding to the center wavelength is a multiple of the center wavelength of each channel. This amount of thickness t will hereafter be referred to as the "WDM matching free spectral range thickness", or "WDM matching FSR thickness".

Moreover, in this case, the round-trip optical length (2 nt cos θ) through VIPA 240 is equal to the wavelength corresponding to the center wavelength in each channel multiplied by an integer for the same θ and different integer, where n is the refractive index of the material between first and second surfaces 242 and 244, θ indicates a propagation direction of a luminous flux corresponding to the center wavelength of each channel. More specifically, as previously described, 0 indicates the propagation direction of a resulting luminous flux as measured from a line perpendicular to the surface of reflecting surfaces 122 and 124.

Therefore, all of the wavelength components corresponding to the center wavelengths will have the same output angle from VIPA 240 and thus the same focusing position on mirror 254, if t is set so that, for the wavelength component corresponding to the center wavelength in each channel, 2 nt cos θ is an integer multiple of the center wavelength of each channel for the same θ and different integer.

For example, a 2 mm physical length in round trip (which is approximately double a 1 mm thickness of VIPA 240) and a refractive index of 1.5 enable all the wavelengths with a spacing of 100 GHz to satisfy this condition. As a result, VIPA 240 can compensate for dispersion in all the channels of a wavelength division multiplexed light at the same time.

Therefore, referring to FIG. 14, with the thickness t set to the WDM matching FSR thickness, VIPA 240 and focusing lens 252 will cause (a) the wavelength component corresponding to the center wavelength of each channel to be focused at point 270 on mirror 254, (b) the wavelength component corresponding to the longer wavelength component of each channel to be focused at point 272 on mirror 254, and (c) the wavelength component corresponding to the shorter wavelength component of each channel to be focused at point 274 on mirror 254. Therefore, VIPA 240 can be used to compensate for chromatic dispersion in all channels of a wavelength division multiplexed light.

Figure 16:
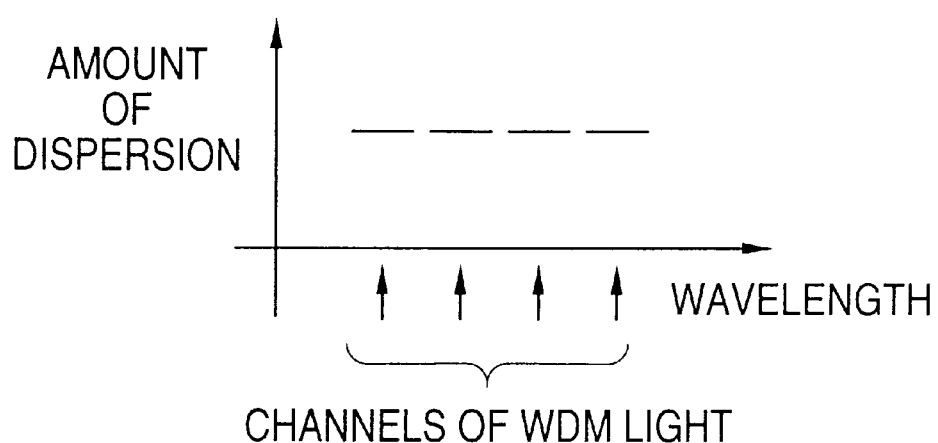
FIG. 16 is a graph illustrating the chromatic dispersion for several channels of a wavelength division multiplexed light, according to an embodiment of the present invention.

FIG. 16 is a graph illustrating the amount of dispersion of several channels of a wavelength division multiplexed light, in a case when the thickness t is set to the WDM matching FSR thickness, according to an embodiment of the present invention. As illustrated in FIG. 16, all the channels are provided with the same dispersion. However, the dispersions are not continuous between the channels. Moreover, the wavelength range for each channel at which VIPA 240 will compensate for dispersion can be set by appropriately setting the size of mirror 254.

If the thickness t is not set to the WDM matching FSR thickness, different channels of a wavelength division multiplexed light will be focused at different points on mirror 254. For example, if the thickness t is one-half, one-third or some other fraction of the round trip optical length thickness, then focusing points of two, three, four or more channels may be focused on the same mirror, with each channel being focused at a different focusing point. More specifically, when the thickness t is one-half the WDM matching FSR thickness, the light from odd channels will focus at the same points on mirror 254, and the light from even channels will focus at the same points on mirror 254. However, the lights from the even channels will be focused at different points from the odd channels.

Figure 17:
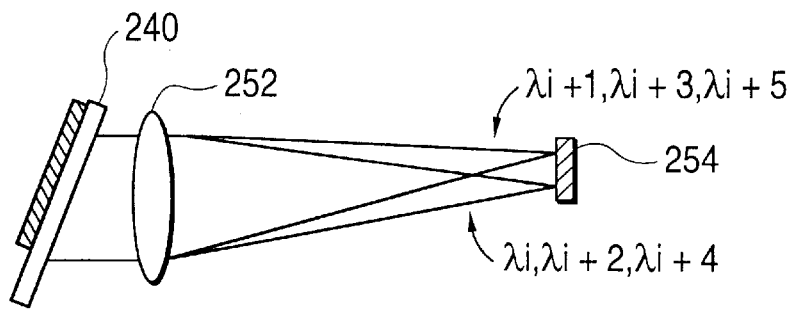
FIG. 17 is a diagram illustrating different channels of a wavelength division multiplexed light being focused at different points on a mirror by a VIPA, according to an embodiment of the present invention.

For example, FIG. 17 is a diagram illustrating different channels being focused at different points on mirror 254. As illustrated in FIG. 17, wavelength components of the center wavelength of even channels are focused at one point on mirror 254, and wavelength components of the center wavelength of odd channels are focused at a different point. As a result, VIPA 240 can adequately compensate for dispersion in all the channels of a wavelength division multiplexed light at the same time.

Figure 18:
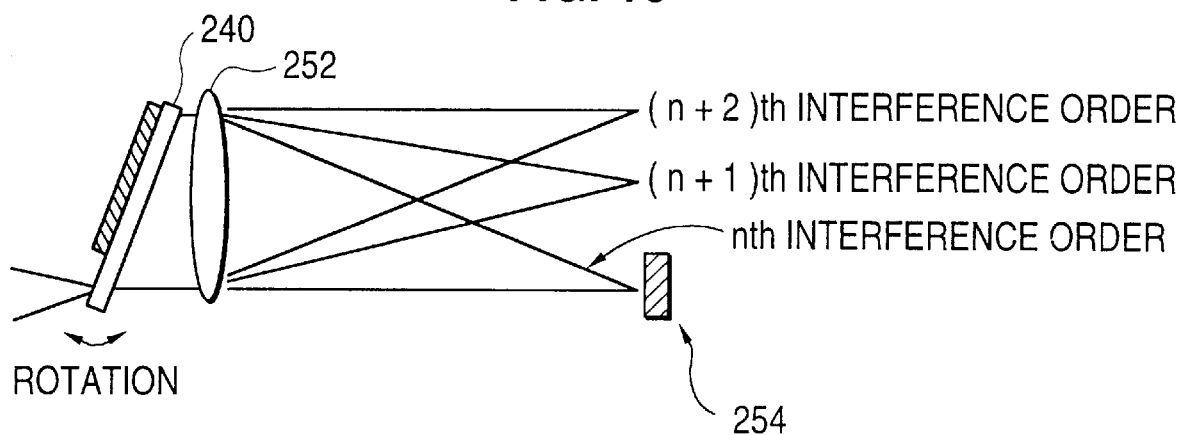
FIG. 18 is a diagram illustrating a side view of an apparatus which uses a VIPA to provide variable chromatic dispersion to light, according to an embodiment of the present invention.

There are several different ways to vary the value of the dispersion added by a VIPA. For example, FIG. 18 is a diagram illustrating a side view of an apparatus which uses a VIPA to provide variable dispersion to light, according to an embodiment of the present invention. Referring now to FIG. 18, VIPA 240 causes each different interference order to have a different angular dispersion. Therefore, the amount of dispersion added to an optical signal can be varied by rotating or moving VIPA 240 so that light corresponding to a different interference order is focused on mirror 254 and reflected back into VIPA 240.

Figure 19:
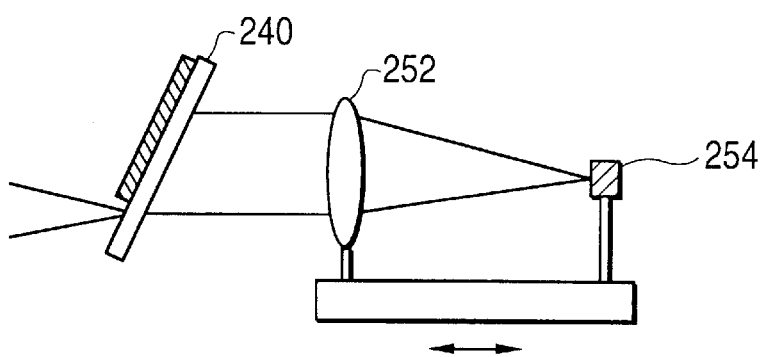
FIG. 19 is a diagram illustrating a side view of an apparatus which uses a VIPA to provide variable chromatic dispersion to light, according to an additional embodiment of the present invention.

FIG. 19 is a diagram illustrating a side view of an apparatus which uses a VIPA to provide variable dispersion, according to an additional embodiment of the present invention. Referring now to FIG. 19, the relative distance between focusing lens 252 and mirror 254 is maintained constant, and focusing lens 252 and mirror 254 are moved together relative to VIPA 240. This movement of focusing lens 252 and mirror 254 changes the shift of light returning to VIPA 240 from mirror 254, and thereby varies the dispersion.

Figure 20A:
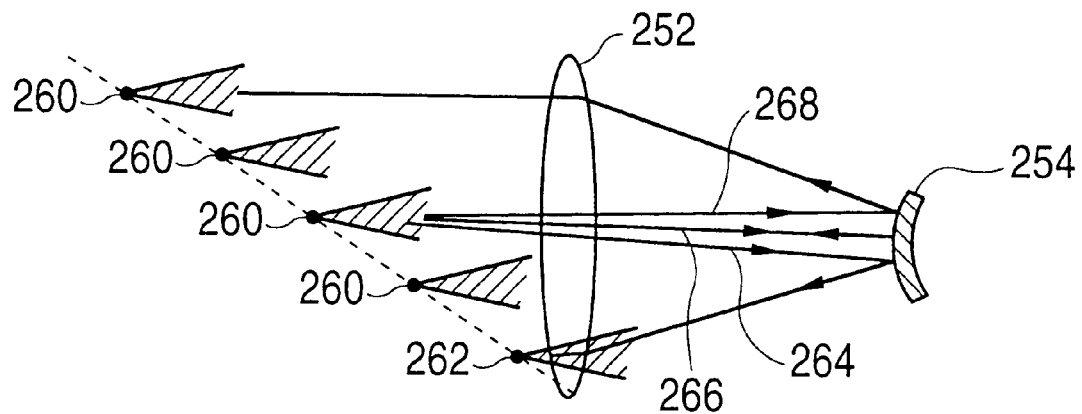
FIGS. 20(A) and 20(B) are diagrams illustrating side views of an apparatus which uses a VIPA to provide chromatic dispersion to light, according to additional embodiments of the present invention.
Figure 20B:
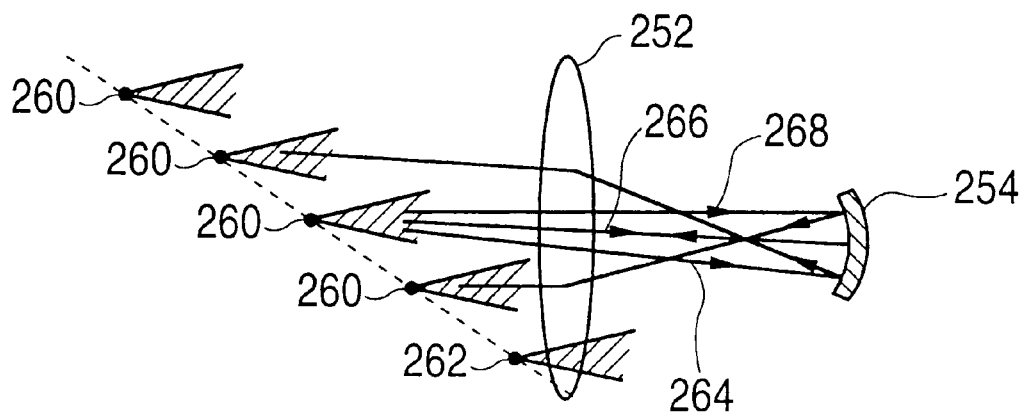

FIGS. 20(A) and 20(B) are diagrams illustrating side views of apparatuses which use a VIPA to provide various values of chromatic dispersion to light, according to additional embodiments of the present invention. FIGS. 20(A) and 20(B) are similar to FIG. 14, in that FIGS. 20(A) and 20(B) illustrate the travel directions of a longer wavelength 264, a center wavelength 266 and a shorter wavelength 268 of light emitted by a virtual image 260 of beam waist 262.

Referring now to FIG. 20(A), mirror 254 is a convex mirror. With a convex mirror, the beam shift is magnified. Therefore, a large chromatic dispersion can be obtained with a short lens focal length and a small amount of space. When mirror 254 is convex, as in FIG. 20(A), the convex shape can typically only be seen from a side view and cannot be seen when viewed from the top.

Referring now to FIG. 20(B), mirror 254 is a concave mirror. With a concave mirror, the sign of the dispersion is inverted. Therefore, anomalous dispersion can be obtained with a short lens focal length and a small space. When mirror 254 is concave, as in FIG. 20(B), the concave shape can typically only be seen from a side view and cannot be seen when viewed from the top.

Mirror 254 can also be a concave or a convex mirror when viewed by the top, thereby indicating that the mirror is a "one-dimensional" mirror.

In FIGS. 20(A) and 20(B), mirror 254 is located at or near the focal point of focusing lens 252.

Figure 21:
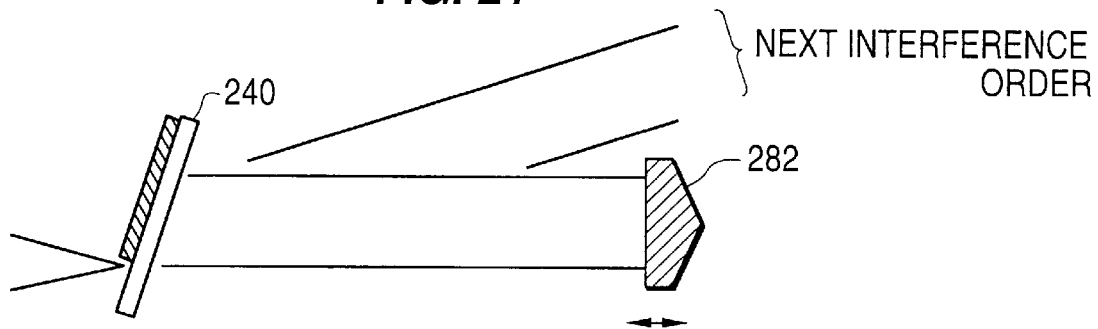
FIG. 21 is a diagram illustrating a side view of an apparatus which uses a VIPA to provide variable dispersion to light, according to a further embodiment of the present invention.

FIG. 21 is a diagram illustrating a side view of an apparatus which uses a VIPA to provide variable dispersion to light, according to a further embodiment of the present invention. Referring now to FIG. 21, focusing lens 252 and mirror 254 are replaced with a retroreflector 282. Preferably, retroreflector 282 has two or three reflecting surfaces and reflects incident light in the opposite direction from the propagation direction of the incident light. The use of retroreflector 282 will cause the VIPA-retroreflector arrangement to add anomalous dispersion. Moreover, retroreflector 202 is movable with respect to VIPA 240, to vary the amount of dispersion.

Figure 22:
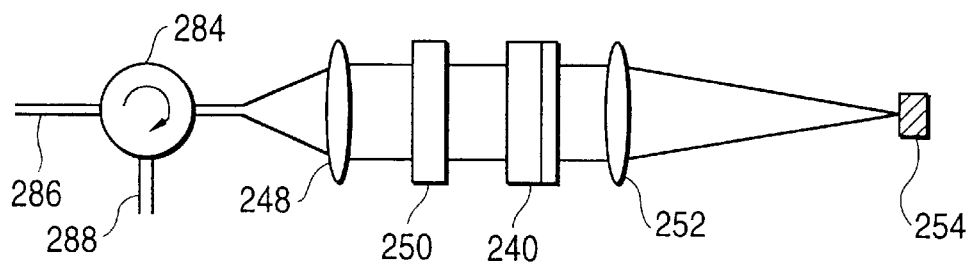
FIG. 22 is a diagram illustrating a top view of the apparatus in FIG. 13, combined with a circulator, according to an embodiment of the present invention.

FIG. 22 is a diagram illustrating a top view of the apparatus in FIG. 13, combined with a circulator, according to an embodiment of the present invention. Referring now to FIG. 22, a circulator 284 receives input light from an input fiber 286 and provides the input light to collimating lens 248. Output light reflected by mirror 254 and back through VIPA 240 is received by circulator 284 and provided to an output fiber 288. In FIG. 22, focusing lens 252 is a "normal" focusing lens, where a "normal" focusing lens refers to a focusing lens which focuses light as seen from both a top view and a side view of the focusing lens.

Figure 23:
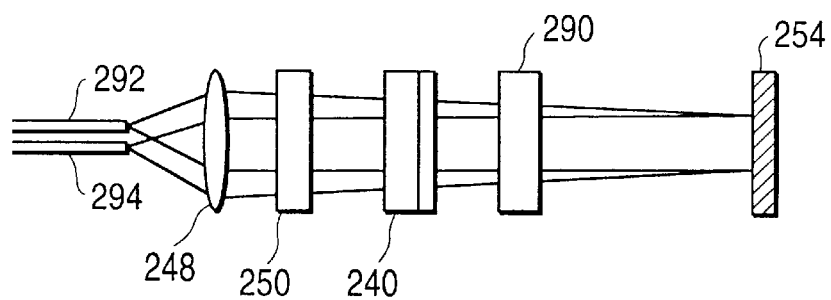
FIG. 23 is a diagram illustrating a top view of an apparatus using a VIPA, according to an embodiment of the present invention.

FIG. 23 is a diagram illustrating a top view of an apparatus which uses a VIPA to add dispersion to light, according to an additional embodiment of the present invention. Referring now to FIG. 23, a cylindrical lens 290 line-focuses light output from VIPA 240 to mirror 254. Mirror 254 is slightly tilted when viewed from the top (as in FIG. 23). An input fiber 292 provides input light to collimating lens 248, and an output fiber 294 receives light reflected by mirror 254 and back through VIPA 240. Therefore, by using cylindrical lens 290 and tilting mirror 254, it is not necessary to use a circulator (such as circulator 284 illustrated in FIG. 22).

Figure 6A:
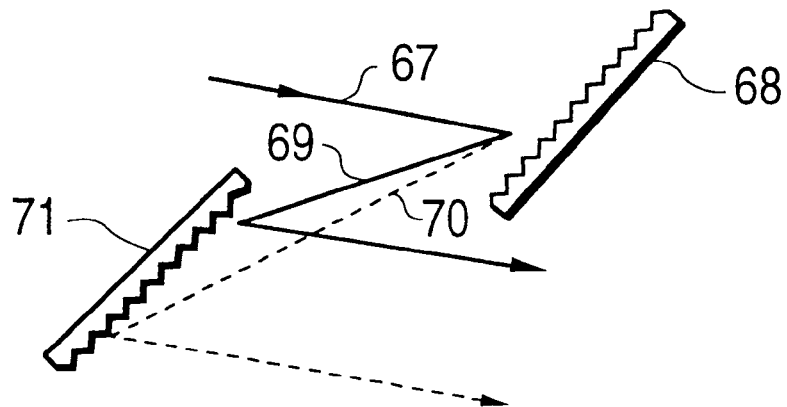
FIG. 6(A) (prior art) is a diagram illustrating a spatial grating pair arrangement for production of anomalous dispersion.
Figure 6B:
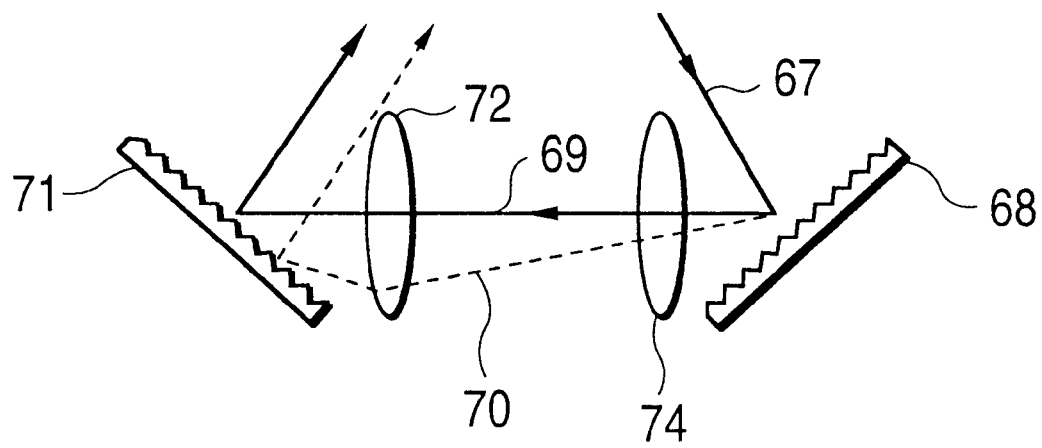
FIG. 6(B) (prior art) is a diagram illustrating a spatial grating pair arrangement for production of normal dispersion.

A VIPA, according to the above embodiments of the present invention, provides a much larger angular dispersion than a diffraction grating. Therefore, a VIPA as described herein can be used to compensate for much larger chromatic dispersion than a spatial grating pair arrangement as illustrated in FIGS. 6(A) and 6(B).

In the above embodiments of the present invention, a mirror is used to reflect light back into VIPA 240. Thus, a mirror can be referred to as a "light returning device" which returns light back to VIPA 240. However, the present invention is not intended to be limited to the use of a mirror as a light returning device. For example, a prism (instead of a mirror) can be used as a light returning device to return light back to VIPA 240. Moreover, various combinations of mirrors and/or prisms, or lens apparatuses can be used as a light returning device to return light back to VIPA.

In the above embodiments of the present invention, a VIPA has reflecting films to reflect light. For example, FIG. 8 illustrates a VIPA 76 having reflecting films 122 and 124 to reflect light. However, it is not intended for a VIPA to be limited to the use of "film" to provide a reflecting surface. Instead, the VIPA must simply have appropriate reflecting surfaces, and these reflecting surfaces may or may not be formed by "film".

Further, in the above embodiments of the present invention, a VIPA includes a transparent glass plate in which multiple reflection occurs. For example, FIG. 8 illustrates a VIPA 76 having a transparent glass plate 120 with reflecting surfaces thereon. However, it is not intended for a VIPA to be limited to the use of a glass material, or any type of "plate", to separate the reflecting surfaces. Instead, the reflecting surfaces must simply be maintained to be separated from each other by some type of spacer. For example, the reflecting surfaces of a VIPA can be separated by "air", without having a glass plate therebetween. Therefore, the reflecting surfaces can be described as being separated by a transparent material which is, for example, optical glass or air.

As described above, the operation of a VIPA is sensitive to the thickness and the refractive index of the material between the reflecting surfaces of the VIPA. In addition, the operational wavelength of a VIPA can be precisely adjusted by controlling the temperature of the VIPA.

Figure 24:
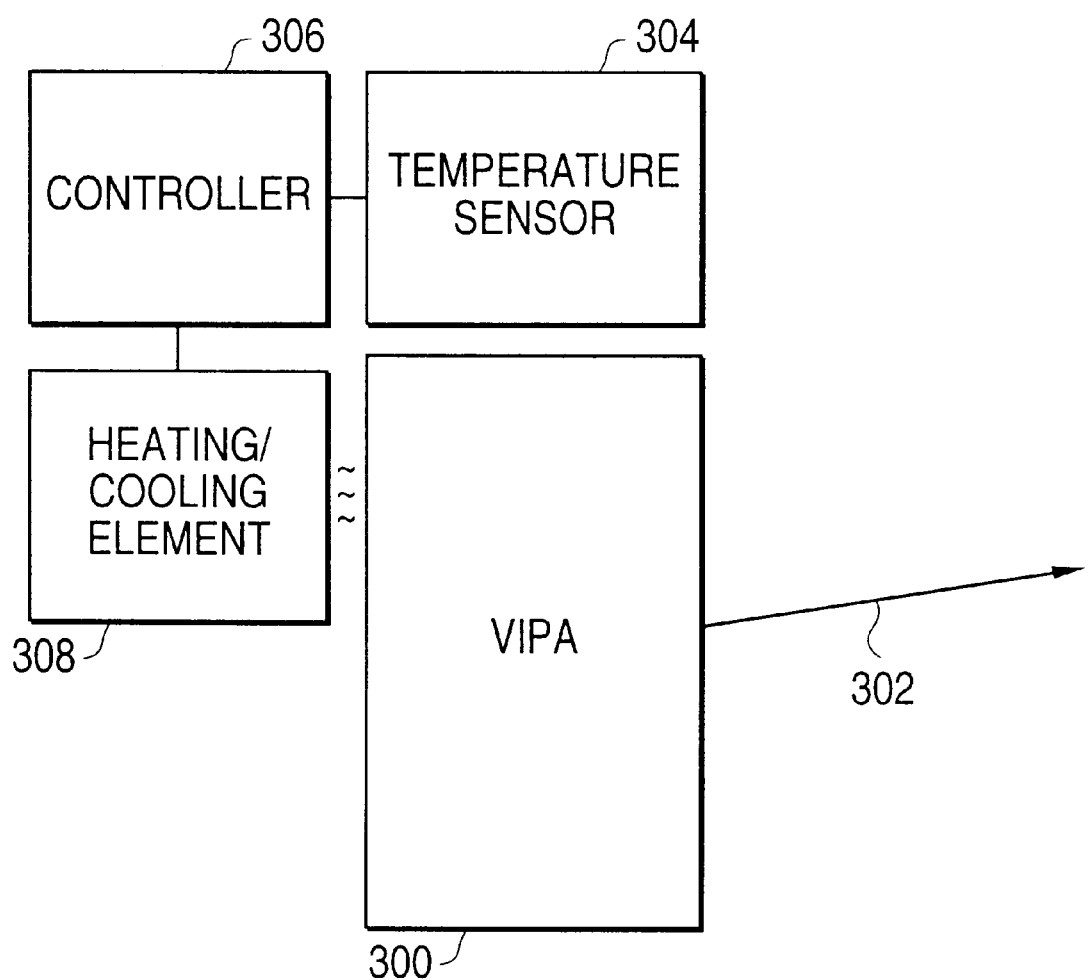
FIG. 24 is a diagram illustrating a controller for controlling the temperature of a VIPA, according to an embodiment of the present invention.

More specifically, FIG. 24 is a diagram illustrating a controller for controlling the temperature of a VIPA, according to an embodiment of the present invention. Referring now to FIG. 24, a VIPA 300 produces an output light 302. A temperature sensor 304 detects the temperature of VIPA 300. Based on the detected temperature, a controller 306 controls a heating/cooling element 308 to control the temperature of VIPA 300 to adjust the operational wavelength of VIPA 300.

For example, raising and lowering the temperature of VIPA can slightly change the output angle of output light 302. Moreover, an output light corresponding to a specific wavelength of input light should be output from VIPA 300 at a precise output angle. Therefore, controller 306 adjusts the temperature of VIPA 300 so that output light 302 is properly output at the correct output angle, and remains stable.

According to the above embodiments of the present invention, an apparatus uses a VIPA to compensate for chromatic dispersion. For this purpose, the embodiments of the present invention are not intended to be limited to a specific VIPA configuration. Instead, any of the different VIPA configurations discussed herein, or those disclosed in related U.S. application Ser. No. 08/685,362, which is incorporated herein by reference, can be used in an apparatus to compensate for chromatic dispersion. For example, the VIPA may or may not have a radiation window, and the reflectances on the various surfaces of the VIPA are not intended to be limited to any specific examples.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a virtually imaged phased array (VIPA) generator which receives an input light at a respective wavelength and produces a corresponding output light propagating away from the VIPA generator and which is spatially distinguishable in accordance with the wavelength of the input light; and
   a light returning device which returns the output light back to the VIPA generator.

2. An apparatus as in claim 1, wherein the light returning device comprises:
   a mirror; and
   a lens which focuses the output light onto the mirror so that the mirror reflects the output light, the reflected light being directed by the lens back to the VIPA generator.

3. An apparatus as in claim 1, wherein
   the VIPA generator produces a plurality of output lights at the wavelength of the input light and which each have a different interference order, and
   the light returning device returns output light back to the VIPA generator having a respective interference order, and does not return output light back to the VIPA generator having any other interference order.

4. An apparatus comprising:
   an angular dispersive component having a passage area to receive light into, and to output light from, the angular dispersive component, the angular dispersive component receiving, through the passage area, an input light having a respective wavelength within a continuous range of wavelengths, and causing multiple reflection of the input light to produce self-interference that forms an output light travelling from the angular dispersive component and which is spatially distinguishable from an output light formed for an input light having any other wavelength within the continuous range of wavelengths; and a light returning device which returns the output light to the angular dispersive component to undergo multiple reflection in the angular dispersive component and then be output from the angular dispersive component through the passage area.

5. An apparatus as in claim 4, wherein the returned output light travels from the light returning device to the angular dispersive component in the exactly opposite direction to which the output light travels from the angular dispersive component to the light returning device.

6. An apparatus as in claim 4, wherein the light returning device comprises:

a mirror; and a lens which focuses the output light formed by the angular dispersive component onto the mirror, the mirror reflecting the focused output light back to the lens and the lens collimating the reflected output light back to the angular dispersive component so that the reflected output light undergoes multiple reflection in the angular dispersive component.

7. An apparatus as in claim 6, wherein the lens is one of the group consisting of a two-dimensional normal lens and a one-dimensional lens.

8. An apparatus as in claim 6, wherein the lens is a cylindrical lens.

9. An apparatus as in claim 6, wherein the mirror is one of the group consisting of a concave mirror and a convex mirror, as viewed from a side view of the mirror.

10. An apparatus as in claim 6, wherein the mirror is one of the group consisting of a flat mirror, a concave mirror and a convex mirror.

11. An apparatus as in claim 4, wherein the angular dispersive component causes multiple reflection of the input light to produce self-interference that forms a plurality of output lights at the wavelength of the input light and which each have a different interference order, and the light returning device returns one of the output lights to the angular dispersive component and does not return the other output lights to the angular dispersive component.

12. An apparatus as in claim 11, wherein the light returning device comprises:

a mirror; and a lens which focuses said one of the output lights onto the mirror, without focusing said other output lights onto the mirror, so that the mirror reflects said one of the output lights back to the lens and the lens collimates the reflected said one of the output lights back to the angular dispersive component to undergo multiple reflection in the angular dispersive component.

13. An apparatus as in claim 12, wherein the dimensions of the mirror allows the mirror to reflect said one of the output lights without reflecting said other output lights.

14. An apparatus as in claim 4, wherein the input light is a wavelength division multiplexed (WDM) light which includes a plurality of channels, each channel having a center wavelength and a range of wavelengths around the center wavelength, for each wavelength of each channel, the angular dispersive component causes multiple reflection to produce self-interference that forms an output light which is spatially distinguishable from an output light formed for any other wavelength in the same channel, and the light returning device returns the output lights to the angular dispersive component so that the returned output lights undergo multiple reflection in the angular dispersive component.

15. An apparatus as in claim 14, wherein the light returning device comprises a mirror, and a lens which focuses the output lights formed by the angular dispersive component onto the mirror so that the output light formed for the center wavelength in each channel is focused at a same point on the mirror, the mirror reflecting the output lights back to the lens and the lens collimating the reflected output lights back to the angular dispersive component so that the reflected output lights undergo multiple reflection in the angular dispersive component.

16. An apparatus as in claim 14, wherein the output light formed for the center wavelength of each channel travels from the angular dispersive component at the,,same dispersion angle.

17. An apparatus as in claim 14, wherein the angular dispersive component comprises first and second reflecting surfaces spaced apart from each other by a distance t, the second reflecting surface having a reflectivity which allows a portion of light reflected thereon to pass therethrough, and a transparent material between the first and second reflecting surfaces over the distance t, and having a refractive index, where the WDM light undergoes the multiple reflection between the first and second reflecting surfaces so that a portion of the WDM light passes through the second reflecting surface each time the WDM light reflects off the second reflecting surface, said portions of the WDM light interfering with each other to thereby produce the output lights through multiple reflection and self-interference of the input light, and the product of 2 t cos θ and the refractive index of the transparent material is an integer multiple of the center wavelength of each channel for the same θ and different integers, where θ indicates a propagation direction of the output light formed for the center wavelength of each channel.

18. An apparatus as in claim 17, further comprising:

a lens for line-focusing the input light into the angular dispersive component through the passage area so that the angular dispersive component causes the multiple reflection of the input light to produce the self-interference.

19. An apparatus as in claim 17, wherein the passage area of the angular dispersive component is a radiation window positioned in the same plane as the first reflecting surface.

20. An apparatus as in claim 4, wherein, the angular dispersive component causes multiple reflection of the input light to produce self-interference that forms a plurality of output lights at the wavelength of the input light and which each have a different interference order, and at least one of the group consisting of the angular dispersive component and the light returning device is movable to change the output light returned by the light returning device to the angular dispersive component, to thereby return an output light having a different interference order to the angular dispersive component.

21. An apparatus as in claim 4, wherein the light returning device is movable relative to the angular dispersive component, to vary an amount of chromatic dispersion provided to the input light.

22. An apparatus as in claim 4, further comprising:
first and second optical fibers; and
a circulator which
provides the input light to the angular dispersive component from the first optical fiber, so that the angular dispersive component causes the multiple reflection of the input light to produce the self-interference, and
provides the returned output light, after undergoing multiple reflection in the angular dispersive component, from the angular dispersive component to the second optical fiber.

23. An apparatus as in claim 4, wherein the light returning device is a retroreflector.

24. An apparatus as in claim 23, wherein the retroreflector is movable relative to the angular dispersive component, to vary an amount of chromatic dispersion provided to the input light.

25. An apparatus as in claim 4, wherein
the angular dispersive component causes multiple reflection of the input light to produce self-interference that forms a plurality of output lights at the wavelength of the input light and which each have a different interference order, and
the light returning device is a retroreflector which reflects only one interference order.

26. An apparatus as in claim 4, wherein the output light is output from the angular dispersive component at an angle which changes in accordance with temperature changes of the angular dispersive component, and the apparatus further comprising:
a controller which controls the temperature of the angular dispersive component to stabilize the output angle.

27. An apparatus as in claim 4, wherein the angular dispersive component comprises
a transparent material; and
first and second reflecting surfaces on opposite sides of the transparent material, the second reflecting surface having a reflectivity which allows a portion of light reflected thereon to pass therethrough, the input light being received by the angular dispersive component through the passage area and undergoing the multiple reflection between the first and second reflecting surfaces so that a portion of the input light passes through the second reflecting surface each time the input light reflects off the second reflecting surface, said portions of the input light interfering with each other to thereby produce the output light through multiple reflection and self-interference of the input light.

28. An apparatus as in claim 27, wherein the reflectance of the first reflecting surface of the angular dispersive component is approximately 100%.

29. An apparatus as in claim 27, wherein the reflectance of the second-reflecting surface of the angular dispersive component is greater than 80% and less than 100%.

30. An apparatus as in claim 27, wherein the transparent material has a wavelength division multiplexing matching free spectral range thickness between the first and second reflecting surfaces.

31. An apparatus comprising:
a virtually imaged phased array (VIPA) generator including
a window which allows light to pass therethrough,
a transparent material, and
first and second reflecting surfaces separated from each other by the transparent material, the second reflecting surface having a reflectivity which allows a portion of light incident thereon to be transmitted therethrough, an input light being received through the window and then being reflected a plurality of times between the first and second reflecting surfaces to cause a plurality of lights to be transmitted through the second reflecting surface, the plurality of transmitted lights interfering with each other to thereby produce a collimated output light through multiple reflection and self-interference of the input light, the output light travelling from the VIPA generator and being spatially distinguishable in accordance with the wavelength of the input light; and
a light returning device which causes the output light to be returned to the second reflecting surface of the VIPA generator and pass therethrough so that the output light undergoes multiple reflection between the first and second reflecting surfaces of the VIPA generator and is then output through the window.

32. An apparatus as in claim 31, wherein the returned output light travels from the light returning device to the VIPA generator in the exactly opposite direction to which the output light travelled from the VIPA generator to the light returning device for all wavelengths of the input light.

33. An apparatus as in claim 31, wherein the first and second reflecting surfaces of the VIPA generator are parallel with each other.

34. An apparatus as in claim 31, wherein the reflectance of the first reflecting surface of the VIPA generator is approximately 100%.

35. An apparatus as in claim 31, wherein the reflectance of the second reflecting surface of the VIPA generator is greater than 80% and less than 100%.

36. An apparatus as in claim 31, wherein the window is in the same plane as the first reflecting surface.

37. An apparatus as in claim 31, wherein the input light is received through the window at an angle which prevents the input light from being reflected by the first reflecting surface before entering the transparent material and which prevents the input light from exiting through the window while being reflected between the first and second reflecting surfaces to produce the collimated output light.

38. An apparatus as in claim 31, wherein the light returning device comprises:
a mirror; and
a lens which focuses the output light produced by the VIPA generator onto the mirror, the mirror reflecting the focused output light back to the lens and the lens collimating the reflected output light back to the VIPA generator so that the collimated, reflected output light undergoes multiple reflection between the first and second reflecting surfaces and is then output through the window.

39. An apparatus as in claim 38, wherein the lens is one of the group consisting of a two-dimensional normal lens and a one-dimensional lens.

40. An apparatus as in claim 38, wherein the lens is a cylindrical lens.

41. An apparatus as in claim 38, wherein the mirror is one of the group consisting of a concave mirror and a convex mirror, as viewed from a side view of the mirror.

42. An apparatus as in claim 38, wherein the mirror is one of the group consisting of a flat mirror, a concave mirror and a convex mirror.

43. An apparatus as in claim 31, wherein the multiple reflection of the received input light between the first and second reflecting surfaces of the VIPA generator causes the VIPA generator to produce a plurality of collimated output lights at the wavelength of the input light and which each have a different interference order, and the light returning device returns one of the output lights to the VIPA generator and does not return the other output lights to the VIPA generator.

44. An apparatus as in claim 43, wherein the light returning device comprises:

a mirror; and a lens which focuses said one of the output lights onto the mirror, without focusing said other output lights onto the mirror, so that the mirror reflects said one of the output lights back to the lens and the lens collimates the reflected said one of the output light back to the VIPA generator to undergo multiple reflection in the VIPA generator and then be output through the window.

45. An apparatus as in claim 44, wherein the dimensions of the mirror allows the mirror to reflect said one of the output lights without reflecting said other output lights.

46. An apparatus as in claim 31, wherein the input light is a wavelength division multiplexed (WDM) light which includes a plurality of channels, each channel having a center wavelength and a range of wavelengths around the center wavelength, for each wavelength of each channel, the multiple reflection of the input light between the first and second reflecting surfaces of the VIPA generator causes a corresponding plurality of lights to be transmitted through the second reflecting surface which interfere with each other to produce a corresponding, collimated output light through multiple reflection and self-interference of the input light, the output light for each wavelength of the channel being spatially distinguishable from an output light formed for any other wavelength in the channel, and the light returning device returns the output lights to the VIPA generator so that the returned output lights undergo multiple reflection between the first and second reflecting surfaces of the VIPA generator and are then output through the window.

47. An apparatus as in claim 46, wherein the light returning device comprises a mirror, and a lens which focuses the output lights produced by the VIPA generator onto the mirror so that the output light formed for the center wavelength in each channel is focused at a same point on the mirror, the mirror reflecting the output lights back to the lens and the lens collimating the reflected output lights back to the VIPA generator so that the reflected output lights undergo multiple reflection between the first and second reflecting surfaces of the VIPA generator and are then output through the window.

48. An apparatus as in claim 46, wherein the output light formed for the center wavelength of each channel travels from the VIPA generator at the same dispersion angle.

49. An apparatus as in claim 46, wherein the returned output light travels from the light returning device to the VIPA generator in the exactly opposite direction to which the output light travelled from the VIPA generator to the light returning device for all wavelengths of the input light.

50. An apparatus as in claim 46, wherein the first and second reflecting surfaces are spaced apart from each other by a distance t, the transparent material has a refractive index, and the product of 2 t cos θ and the refractive index of the transparent material is an integer multiple of the center wavelength of each channel for the, same θ and different integers, where θ indicates a propagation direction of the output light produced by the VIPA generator for the center wavelength of each channel.

51. An apparatus as in claim 50, further comprising:

a lens for line-focusing the input light into the VIPA generator through the window.

52. An apparatus as in claim 31, wherein the multiple reflection of the received input light between the first and second reflecting surfaces of the VIPA generator causes the VIPA generator to produce a plurality of collimated output lights at the wavelength of the input light and which each have a different interference order, and at least one of the group consisting of the VIPA generator and the light returning device is movable to change the output light returned by the light returning device to the VIPA generator, to thereby return an output light having a different interference order to the VIPA generator.

53. An apparatus as in claim 31, wherein the light returning device is movable relative to the VIPA generator, to vary an amount of chromatic dispersion provided to the input light.

54. An apparatus as in claim 31, further comprising:

first and second optical fibers; and a circulator which provides the input light to the VIPA generator through the window from the first optical fiber, and provides the returned output light, after undergoing multiple reflection in the VIPA generator, from the VIPA generator to the second optical fiber.

55. An apparatus as in claim 31, wherein the light returning device is a retroreflector.

56. An apparatus as in claim 55, wherein the retroreflector is movable relative to the VIPA generator, to vary an amount of chromatic dispersion provided to the input light.

57. An apparatus as in claim 31, wherein the multiple reflection of the received input light between the first and second reflecting surfaces of the VIPA generator causes the VIPA generator to produce a plurality of collimated output lights at the wavelength of the input light and which each have a different interference order, and the light returning device is a retroreflector which reflects only one interference order.

58. An apparatus as in claim 31, wherein the first and second reflecting surfaces are multi-layer dielectric interference films.

59. An apparatus as in claim 31, wherein the transparent material is one of the group consisting of optical glass and air.

60. An apparatus as in claim 31, wherein the output light is output from the VIPA generator at an angle which changes in accordance with temperature changes of the VIPA generator, and the apparatus further comprising:

a controller which controls the temperature of the VIPA generator to stabilize the output angle.

61. An apparatus comprising:

a virtually imaged phased array (VIPA) generator which receives an input light and produces a corresponding output light propagating away from the VIPA; and a light returning device which returns the output light back to the VIPA generator, wherein the light returning device comprises
a mirror, and
a lens which focuses the output light onto the mirror so that the mirror reflects the output light, the reflected light being directed by the lens back to the VIPA generator.

62. An apparatus comprising:
a virtually imaged phased array (VIPA) generator which receives an input light and produces a corresponding output light propagating away from the VIPA; and
a light returning device which returns the output light back to the VIPA generator, wherein
the input light is at a respective wavelength,
the VIPA generator produces a plurality of output lights at the wavelength of the input light and which each have a different interference order, and
the light returning device returns output light back to the VIPA generator having a respective interference order, and does not return output light back to the VIPA generator having any other interference order.

63. An apparatus comprising:
first and second surfaces, the second surface having a reflectivity which causes a portion of light incident thereon to be transmitted therethrough, where
an input light at a respective wavelength is focused into a line, and
the first and second surfaces are positioned so that the input light radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength; and
a light returning device which returns the output light to the second surface so that the output light passes through the second surface and undergoes multiple reflection between the first and second surfaces.

64. An apparatus as in claim 63, wherein the light returning device is a mirror.

65. An apparatus comprising:
generating means for receiving a line focused input light at a respective wavelength and for producing a corresponding output light propagating away from the generating means in a direction determined by the wavelength of the input light; and
means for returning the output light back to the generating means.

66. An apparatus receiving an input light at a respective wavelength and focused into a line, the apparatus comprising:
first and second surfaces spaced apart from each other;
means for causing the input light to radiate from the line to be reflected a plurality of times between the first and second surfaces and thereby cause a plurality of lights to be transmitted through the second surface, and for causing the transmitted lights to interfere with each other to produce an output light which is spatially distinguishable from an output light produced for an input light at a different wavelength; and
means for returning the output light to the second surface so that the output light passes through the second surface and undergoes multiple reflection between the first and second surfaces.

* * * * *

UNITED STATES PATENT AND TRADEMARK OFFICE
CERTIFICATE OF CORRECTION

PATENT NO.: 5,930,045
DATED : July 27, 1999
INVENTOR(S): Masataka SHIRASAKI

It is certified that error appears in the above-identified patent and that said Letters Patent is hereby corrected as shown below:

On the title page, under Other Publications, line 6, change "Demultimplexer" to --Demultiplexer--.

Col. 18, line 22, delete ",,";
line 57, delete "," (second occurrence);
line 57, begin a new paragraph with "the".

Col. 20, line 50, begin a new paragraph with "the" (second occurrence).

Col. 21, line 40, begin a new paragraph with "the" (second occurrence).

Col. 22, line 7, delete ",";
line 32, begin a new subparagraph with "provides";
line 36, make the paragraph beginning "provides..." a subparagraph.

Signed and Sealed this

Twenty-first Day of December, 1999

Attest:

Q. TODD DICKINSON

*Attesting Officer*  *Acting Commissioner of Patents and Trademarks*